(12) United States Patent
Crist et al.

(10) Patent No.: US 10,106,032 B2
(45) Date of Patent: *Oct. 23, 2018

(54) REFUSE VEHICLE HAVING TAILGATE-MOUNTED CNG TANKS

(71) Applicant: Oshkosh Corporation, Oshkosh, WI (US)

(72) Inventors: Lucas D. Crist, Rochester, MN (US); Grant D. Wildgrube, Faribault, MN (US); Jarud H. Hoefker, Dodge Center, MN (US); Leslie H. Schwartz, Owatonna, MN (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/437,139

(22) Filed: Feb. 20, 2017

(65) Prior Publication Data

US 2017/0158050 A1    Jun. 8, 2017

Related U.S. Application Data

(63) Continuation of application No. 14/807,805, filed on Jul. 23, 2015, now Pat. No. 9,579,969.
(Continued)

(51) Int. Cl.
| | |
|---|---|
| *B60K 15/07* | (2006.01) |
| *B65F 3/00* | (2006.01) |
| *B60K 15/03* | (2006.01) |
| *B60K 15/01* | (2006.01) |
| *B60K 15/063* | (2006.01) |

(52) U.S. Cl.
CPC ............. *B60K 15/07* (2013.01); *B60K 15/013* (2013.01); *B60K 15/03006* (2013.01); *B65F 3/00* (2013.01); *B60K 2015/0319* (2013.01); *B60K 2015/03026* (2013.01);
(Continued)

(58) Field of Classification Search
CPC ............ B60K 15/03006; B60K 15/013; B60K 15/063; B60K 2015/03026; B60K 2015/03309; B60K 2015/03328; B65F 3/00

See application file for complete search history.

(56) References Cited

U.S. PATENT DOCUMENTS

| | | |
|---|---|---|
| 2,879,081 A | 3/1959 | Keehn |
| 4,024,897 A | 5/1977 | Hall |
| (Continued) | | |

*Primary Examiner* — James A Shriver, II
*Assistant Examiner* — Brian L Cassidy
(74) *Attorney, Agent, or Firm* — Foley & Lardner LLP

(57) ABSTRACT

A refuse vehicle includes a chassis having an engine, a body assembly, a tailgate pivotally attached to the body assembly, a CNG fuel system having a CNG fuel tank coupled to the tailgate and moveable therewith, the engine configured to be powered by the CNG fuel system, at least one of one a non-structural conduit, a non-structural raceway, and a non-structural channel configured to contain at least one of wiring and a hydraulic line, and an impact mitigation system. The impact mitigation system is a passive system and includes a skeleton. The skeleton includes a plurality of structural frame members positioned to direct impact loads around the CNG fuel tank. The impact mitigation system provides a protected region within which the CNG fuel tank is disposed.

19 Claims, 22 Drawing Sheets

Related U.S. Application Data

(60) Provisional application No. 62/029,212, filed on Jul. 25, 2014.

(52) U.S. Cl.
CPC .............. *B60K 2015/03309* (2013.01); *B60K 2015/03328* (2013.01); *B60K 2015/0638* (2013.01); *B60Y 2306/01* (2013.01)

(56) References Cited

U.S. PATENT DOCUMENTS

| | | | |
|---|---|---|---|
| 4,096,878 A | 6/1978 | Adams et al. | |
| 4,139,019 A | 2/1979 | Bresie et al. | |
| 4,917,356 A | 4/1990 | Shirdavani | |
| 5,443,578 A | 8/1995 | Davis, Jr. | |
| 5,488,970 A | 2/1996 | Cippitani | |
| 5,522,369 A * | 6/1996 | Povinger | F02B 43/00 123/447 |
| 5,611,316 A * | 3/1997 | Oshima | F02M 21/0224 123/494 |
| 5,632,250 A * | 5/1997 | Kato | F02D 41/0027 123/198 DB |
| 5,788,158 A | 8/1998 | Relyea | |
| 5,794,979 A * | 8/1998 | Kasuga | B60K 15/013 180/69.5 |
| 5,839,664 A | 11/1998 | Relyea | |
| 6,257,360 B1 | 7/2001 | Wozniak et al. | |
| 6,293,364 B1 | 9/2001 | Anderson et al. | |
| 6,401,698 B1 * | 6/2002 | Yamazaki | F02D 41/0027 123/529 |
| 6,418,962 B1 | 7/2002 | Wozniak et al. | |
| 6,467,466 B1 * | 10/2002 | Maekawa | F02D 41/0027 123/198 D |
| 6,481,751 B1 | 11/2002 | Davis, Jr. et al. | |
| 6,676,163 B2 | 1/2004 | Joitescu et al. | |
| 6,860,332 B1 | 3/2005 | Archer et al. | |
| 7,063,355 B2 | 6/2006 | Hashimura | |
| 7,137,474 B2 | 11/2006 | Yokote | |
| 7,234,534 B2 | 6/2007 | Froland et al. | |
| 7,380,565 B2 | 6/2008 | Eichler | |
| 7,389,826 B2 | 6/2008 | Linsmeier et al. | |
| 7,543,667 B2 | 6/2009 | Hwang et al. | |
| 7,581,557 B2 | 9/2009 | Lindblom et al. | |
| 7,611,075 B2 | 11/2009 | Relyea et al. | |
| 7,631,901 B2 | 12/2009 | Diehl | |
| 7,730,903 B2 | 6/2010 | Lindblom et al. | |
| 7,784,554 B2 | 8/2010 | Grady et al. | |
| 7,856,998 B2 | 12/2010 | Bauer | |
| 7,874,373 B2 | 1/2011 | Morrow et al. | |
| 7,882,587 B2 | 2/2011 | Tagliaferri | |
| 8,096,522 B2 * | 1/2012 | Bachmaier | G05D 16/2093 251/30.01 |
| 8,182,194 B2 | 5/2012 | Pruteanu et al. | |
| 8,302,997 B2 | 11/2012 | Veenstra | |
| 8,499,782 B2 | 8/2013 | Bauer et al. | |
| 8,690,191 B2 | 4/2014 | Gentry | |
| 8,764,029 B2 | 7/2014 | Venton-Walters et al. | |
| 8,807,256 B2 | 8/2014 | Gibb et al. | |
| 8,876,133 B2 | 11/2014 | Ellifson | |
| 8,881,933 B2 | 11/2014 | Green | |
| 8,991,423 B2 | 3/2015 | Matsukawa | |
| 9,046,218 B2 | 6/2015 | MacAluso et al. | |
| 9,061,169 B2 | 6/2015 | Linsmeier | |
| 9,068,534 B2 * | 6/2015 | Erasala | F02M 21/0239 |
| 9,114,930 B2 * | 8/2015 | Simmons | B60K 15/07 |
| 2005/0109403 A1 * | 5/2005 | Gotthelf | G05D 16/0669 137/505.34 |
| 2006/0032939 A1 | 2/2006 | Relyea et al. | |
| 2006/0181108 A1 * | 8/2006 | Cleland | E05F 15/43 296/146.4 |
| 2008/0156809 A1 * | 7/2008 | Mizuno | B60K 15/07 220/562 |
| 2009/0152043 A1 | 6/2009 | Lee | |
| 2012/0138182 A1 * | 6/2012 | Liang | F02M 21/06 137/899 |
| 2012/0161430 A1 | 6/2012 | Mulanon | |
| 2012/0228307 A1 | 9/2012 | Simmons | |
| 2012/0280481 A1 | 11/2012 | Gentry | |
| 2013/0068905 A1 | 3/2013 | Green | |
| 2013/0069357 A1 | 3/2013 | Green | |
| 2013/0092694 A1 | 4/2013 | Green | |
| 2013/0199863 A1 * | 8/2013 | Robbins | B60K 15/063 180/69.4 |
| 2013/0255636 A1 * | 10/2013 | Pursifull | F02D 19/0613 123/446 |
| 2014/0061266 A1 | 3/2014 | Milton et al. | |
| 2014/0069972 A1 | 3/2014 | Wllemsen | |
| 2014/0137953 A1 * | 5/2014 | Gibb | F17C 1/00 137/351 |
| 2014/0175782 A1 | 6/2014 | Sloan et al. | |
| 2014/0175783 A1 | 6/2014 | Sloan et al. | |
| 2014/0199143 A1 | 7/2014 | Gentry | |
| 2014/0238327 A1 * | 8/2014 | Hagen | F02M 21/0215 123/1 A |
| 2014/0261728 A1 * | 9/2014 | Erasala | F02M 21/0239 137/15.01 |
| 2014/0367954 A1 * | 12/2014 | McKinney | B65F 3/00 280/834 |
| 2015/0033962 A1 | 2/2015 | Schwartz et al. | |
| 2015/0059878 A1 | 3/2015 | Kobayashi et al. | |
| 2015/0107693 A1 | 4/2015 | Green | |
| 2015/0112506 A1 | 4/2015 | Hanlin et al. | |
| 2015/0159564 A1 | 6/2015 | Wildgrube et al. | |
| 2015/0175353 A1 | 6/2015 | Gillmore et al. | |
| 2016/0023548 A1 * | 1/2016 | Crist | B60K 15/03006 180/271 |
| 2016/0089690 A1 | 3/2016 | Wildgrube | |
| 2016/0177857 A1 * | 6/2016 | Sarikaya | F02M 37/0023 73/114.38 |
| 2017/0158050 A1 * | 6/2017 | Crist | B60K 15/07 |
| 2017/0297425 A1 * | 10/2017 | Wildgrube | F02M 21/0212 |

\* cited by examiner

REFUSE VEHICLE HAVING TAILGATE-MOUNTED CNG TANKS

CROSS-REFERENCE TO RELATED APPLICATIONS

This application is a continuation of U.S. patent application Ser. No. 14/807,805, filed Jul. 23, 2015, which claims the benefit of U.S. Provisional Patent Application No. 62/029,212, filed Jul. 25, 2014, both of which are incorporated herein by reference in their entireties.

BACKGROUND

Refuse vehicles collect a wide variety of waste, trash, and other material from residences and businesses. Operators use the refuse vehicle to transport the material from various waste receptacles within a municipality to a storage or processing facility (e.g., a landfill, an incineration facility, a recycling facility, etc.). Refuse vehicles may be powered by an internal combustion engine that burns gasoline, diesel fuel, or natural gas, among other types of fuel. Where the fuel is natural gas, various tanks provide fuel to a regulator, which reduces the pressure of the natural gas before it enters the engine. Mechanical regulators provide an inconsistent flow of natural gas that varies based upon the pressure of the fuel in the natural gas tanks. The natural gas tanks may be positioned along the chassis and under the body assembly. Such positioning may require a longer vehicle wheel base. To isolate the natural gas tanks, an operator boards the refuse vehicle and engages valves positioned at the head of each tank. Despite these deficiencies, assemblies that provide variations in the natural gas flow and include tanks positioned along the vehicle chassis that must be individually isolated remain the primary fuel systems for natural gas powered refuse vehicles.

SUMMARY

One embodiment relates to a refuse vehicle that includes a chassis having an engine, a body assembly defining an internal volume and coupled to the chassis, a tailgate pivotally attached to the body assembly and movable between an open position and a closed position to selectively expose the internal volume of the body assembly, a CNG fuel system having a CNG fuel tank coupled to the tailgate and moveable therewith, the engine configured to be powered by the CNG fuel system, at least one of one a non-structural conduit, a non-structural raceway, and a non-structural channel configured to contain at least one of wiring and a hydraulic line, and an impact mitigation system. The impact mitigation system is a passive system and includes a skeleton. The skeleton includes a plurality of structural frame members positioned to direct impact loads around the CNG fuel tank. The impact mitigation system provides a protected region within which the CNG fuel tank is disposed.

Another embodiment relates to a fuel system for a vehicle that includes a CNG fuel tank configured to provide fuel to power an engine of the vehicle, a shutoff valve configured to be positioned along a flow path between the CNG fuel tank and the engine, the shutoff valve configured to selectively restrict a flow of fuel along the flow path, a temperature sensor configured to monitor a temperature of at least one of the engine of the vehicle and a temperature associated with a body area of the vehicle and provide a temperature signal, and a controller coupled to the temperature sensor and the shutoff valve. The controller is configured to at least one of engage and disengage the shutoff valve in response to the temperature signal indicating a temperature in excess of a temperature threshold.

Still another embodiment relates to a fuel system for a vehicle that includes a CNG fuel tank configured to provide fuel to power an engine of the vehicle, a shutoff valve positioned along a flow path between the CNG fuel tank and the engine, the shutoff valve configured to selectively restrict a flow of fuel along the flow path, a pressure sensor positioned along the flow path and configured to monitor a pressure of the flow of fuel, and a controller coupled to the pressure sensor and the shutoff valve. The controller is configured to identify a pressure fault condition in response to the pressure of the fuel falling below a pressure threshold, the pressure threshold relating to an expected operating pressure of the fuel, and at least one of engage and disengage the shutoff valve such that the shutoff valve restricts the flow of fuel in response to the pressure fault condition.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
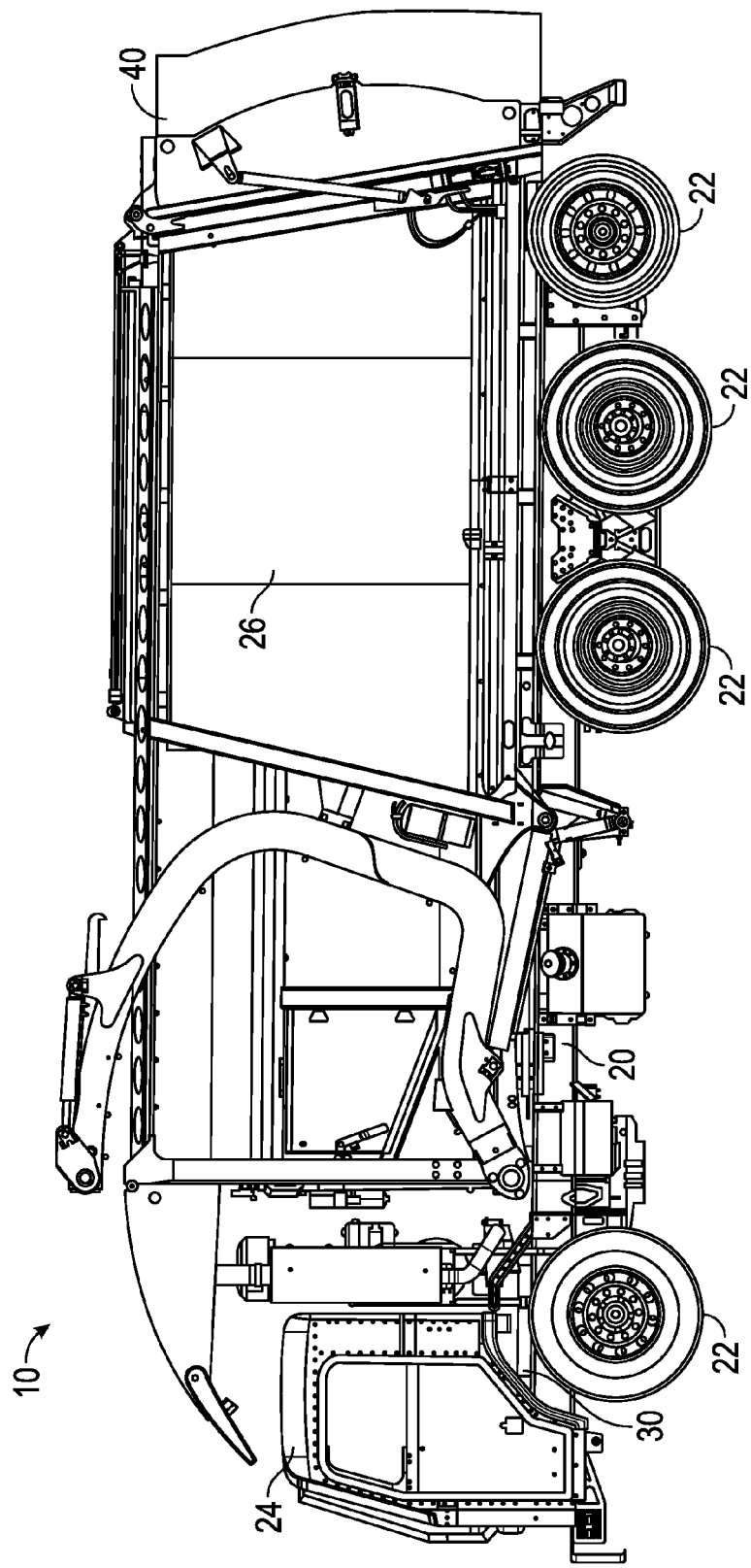
FIG. 1 is a side elevation view of a refuse vehicle including a fuel pod, according to an exemplary embodiment.

Referring to the exemplary embodiment shown in FIG. 1, a vehicle, shown as refuse truck 10 (e.g., garbage truck, waste collection truck, sanitation truck, etc.), includes a chassis, shown as chassis 20. According to an alternative embodiment, the vehicle is another type of vehicle (e.g., a concrete mixer truck, a military truck, etc.). Chassis 20 includes a pair of longitudinal frame rails extending along the length of refuse truck 10, according to an exemplary embodiment. In one embodiment, the prime mover provides power to various systems of refuse truck 10. By way of example, the prime mover may provide power to one or more tractive elements, shown as wheels 22, to move refuse truck 10. By way of another example, the prime mover may provide power to a pneumatic system, a hydraulic system, or still another system. A power take off unit may facilitate such power distribution.

Referring again to the exemplary embodiment shown in FIG. 1, refuse truck 10 includes a cab, shown as cab 24, that is coupled to chassis 20. Cab 24 includes various components to facilitate operation of refuse truck 10 by an operator (e.g., a seat, a steering wheel, hydraulic controls, etc.). Cab 24 is positioned at a front end of refuse truck 10. In other embodiments, the cab is otherwise positioned.

According to the embodiment shown in FIG. 1, refuse truck 10 includes a body assembly coupled to chassis 20. The body assembly includes a storage body, shown as body 26, that extends along the length of chassis 20 and is positioned behind cab 24. In other embodiments, body 26 is otherwise positioned. Refuse is stored within body 26 during transport from various waste receptacles within a municipality to a storage or processing facility (e.g., a landfill, an incineration facility, a recycling facility, etc.). A packing assembly may be positioned within body 26 to compact the loose refuse, thereby increasing the storage capacity of body 26. In one embodiment, body 26 includes an upper door to reduce the likelihood of loose refuse blowing out of body 26 during transport. As shown in FIG. 1, the body assembly also includes an arm having lift forks that engage a container to load refuse into body 26.

Referring still to FIG. 1, chassis 20 includes a prime mover, shown as engine 30, a drive train, hydraulic components (e.g., a hydraulic pump, etc.), and still other components to facilitate the operation of refuse truck 10. According to an exemplary embodiment, engine 30 is an internal combustion engine configured to generate mechanical power by igniting natural gas. As shown in FIG. 1, refuse truck 10 includes a fuel pod, shown as fuel pod 40. In one embodiment, fuel pod 40 is configured to store compressed natural gas (CNG). In another embodiment, fuel pod 40 is configured to store liquefied natural gas (LNG). Fuel pod 40 includes a fuel tank that is configured to store fuel (e.g., natural gas) for use in engine 30. In one embodiment, the fuel tank contains CNG. In another embodiment, the fuel tank contains LNG. The fuel tank may be configured to store CNG or LNG under preferred conditions (e.g., pressure, temperature, etc.). In one embodiment, the fuel tank is configured to store CNG at a tank pressure (e.g., 3,600 PSI, etc.). In other embodiments, the prime mover includes one or more electric motors. The electric motors may consume electrical power from an on-board energy storage device (e.g., batteries, ultra-capacitors, etc.), from an on-board generator (e.g., an internal combustion engine, a fuel cell, etc.), from an external power source (e.g., overhead power lines, etc.), or still another source and provide power to the systems of the refuse truck 10. Fuel pod 40 may store fuel for use by the on-board generator.

Figure 2:
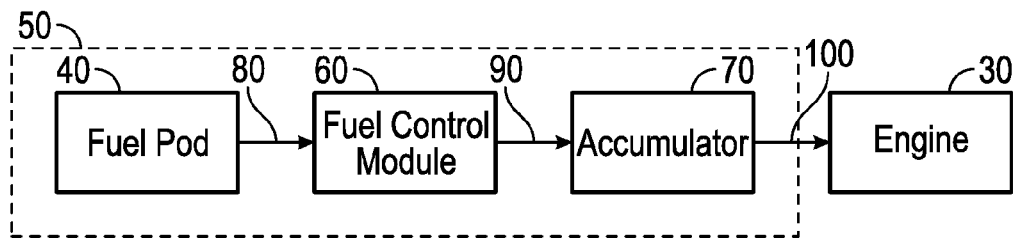
FIG. 2 is a schematic view of a natural gas system for a vehicle, according to an exemplary embodiment.

Referring next to the exemplary embodiment shown in FIG. 2, a natural gas system for a vehicle, shown as natural gas system 50, includes fuel pod 40, a fuel control module 60, and an accumulator 70. In one embodiment, the vehicle is a refuse truck. In another embodiment, the vehicle is another type of vehicle (e.g., a concrete mixer truck, a military truck, etc.). According to an exemplary embodiment, natural gas system 50 is configured to provide natural gas to engine 30. Engine 30 may combust the natural gas to power one or more tractive elements. In other embodiments, engine 30 combusts the natural gas to generate electricity or power a component of refuse truck 10. According to still other embodiments, natural gas system 50 is configured to provide natural gas for use by another component of refuse truck 10 (e.g., a fuel cell, etc.).

According to an exemplary embodiment, fuel control module 60 includes a pressure regulator configured to reduce the pressure of the natural gas from the tank pressure to a working pressure. In one embodiment, a heater (e.g., an electric heater, etc.) is coupled to the pressure regulator. The heater reduces the risk of freezing the valve due to the temperature decrease of the expanding natural gas. In one embodiment, the heater is controlled with a controller. The controller may operate according to a predetermined schedule (e.g., when the vehicle is running, a cycle of on for five minutes and off for five minutes, etc.) or may operate when a condition of the valve reaches a threshold value (e.g., when the valve temperature falls below 40 degrees Fahrenheit based on sensor signals from a temperature sensor, etc.). In still another embodiment, heat tape is wrapped around the pressure regulator, thereby reducing the risk of freezing the valve.

As shown in FIG. 2, fuel pod 40 is coupled to (e.g., in fluid communication with, etc.) fuel control module 60 with a conduit (i.e., pipe, hose, duct, line, tube, etc.), shown as high-pressure line 80. Fuel control module 60 is coupled to accumulator 70 and engine 30 with a second conduit, shown as low-pressure line 90, and a third conduit, shown as low-pressure line 100, according to an exemplary embodiment. The pressure regulator of fuel control module 60 reduces the pressure of the natural gas in high-pressure line 80 to provide natural gas along low-pressure line 90 and low-pressure line 100 at the working pressure. Fuel control module 60 may also include various other components (e.g., a fueling receptacle, pressure transducer coupled to a fuel gauge, high-pressure filter, etc.).

High-pressure line 80, low-pressure line 90, and low-pressure line 100 define a flow path between fuel pod 40 and engine 30. In one embodiment, fuel flows from fuel pod 40 to engine 30, and accumulator 70 is positioned along the flow path downstream of fuel control module 60. In other embodiments, fuel pod 40 is coupled to a first end of a conduit that defines a flow path, the conduit having a second end that is configured to be coupled to an engine. Fuel control module 60 may be disposed along the flow path, and accumulator 70 may be disposed along the flow path downstream of fuel control module 60.

Fuel control module 60 may provide natural gas to low-pressure line 90 at a flow rate and pressure that varies based on a characteristic of the natural gas from fuel pod 40 (e.g., the pressure of the natural gas from fuel pod 40, the flow rate of natural gas from fuel pod 40, etc.). As natural gas in fuel pod 40 is depleted during use, the tank pressure and flow rate decreases. Various other factors may also contribute to variations in the inlet flow of natural gas (e.g., the natural gas in high-pressure line 80, etc.). Such variations in the inlet flow of natural gas may cause fluctuations in the stream of natural gas provided by fuel control module 60. By way of example, the fluctuations may include a pressure variation, a temperature variation, a flow rate variation, or still another variation. The fluctuations may be produced due to the physical interaction of the natural gas with a mechanical regulator of fuel control module 60 of for still another reason.

According to an exemplary embodiment, accumulator 70 is configured to buffer variations in the flow of natural gas such that engine 30 receives a consistent flow of natural gas (e.g., a flow of natural gas that varies within ten percent of a target flow rate, a flow of natural gas that varies within ten percent of a target pressure, etc.). By way of example, accumulator 70 may be configured to buffer pressure variations in the flow of natural gas such that engine 30 receives a flow of natural gas at a consistent pressure. By way of another example, accumulator 70 may be configured to buffer flow rate variations such that engine 30 receives natural gas at a consistent flow rate. During operation, pressure variations, flow rate variations, or still other variations may cause the power produced by engine 30 to fluctuate. Power fluctuations may be undesirable where, by way of example, engine 30 powers tractive elements of a refuse truck. In one embodiment, accumulator 70 includes a drain and is positioned at a low height relative to the other components of natural gas system 50. Such a position and drain allows for oil and other contaminants to be drained from natural gas system 50.

Figure 3A:
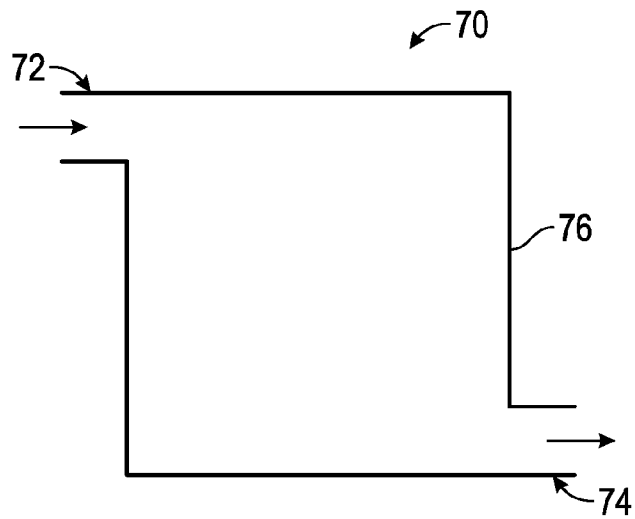
FIGS. 3A-5 are side plan views of accumulators for a natural gas system, according to various alternative embodiments.
Figure 3B:
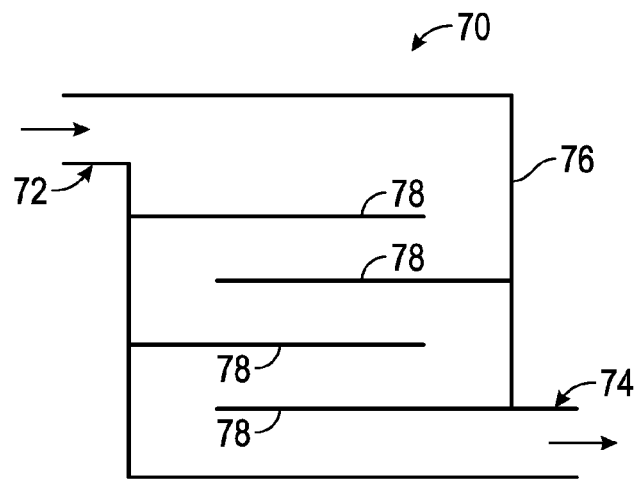

Referring next to the exemplary embodiments shown in FIGS. 3A-3B, accumulator 70 is a reservoir that includes an inlet, shown as inlet 72, and an outlet, shown as outlet 74, defined within a housing 76. As shown in FIGS. 3A-3B, housing 76 has a rectangular cross-sectional shape. In other embodiments, housing 76 is otherwise shaped (e.g., cylindrical, spherical, etc.). Housing 76 defines an inner volume that may be fixed or variable. In one embodiment, inlet 72 is configured to be coupled to fuel control module 60 and outlet 74 is configured to be coupled to engine 30. In another embodiment, outlet 74 is configured to be coupled to still another component of natural gas system 50 (e.g., a high-pressure coalescing filter, etc.).

Natural gas flows along a flow path through accumulator 70, according to an exemplary embodiment. The flow path may be defined between inlet 72 and outlet 74 through the inner volume of housing 76. A flow of natural gas entering inlet 72 may include one or more fluctuations. By way of example, the pressure, temperature, or flow rate, among other characteristics, of the flow entering inlet 72 may vary as a function of time. According to an exemplary embodiment, the inner volume of housing 76 contains a volume of natural gas that buffers fluctuations in pressure, temperature, or flow rate of natural gas flow through inlet 72. By way of example, a pressure fluctuation acting on natural gas at inlet 72 is dissipated as it propagates through the natural gas within the inner volume of housing 76 such that the pressure fluctuation is reduced or eliminated at outlet 74. According to another exemplary embodiment, an interaction between the flow of natural gas and an inner surface of housing 76 dissipates pressure variations as the natural gas flows between inlet 72 and outlet 74.

According to an exemplary embodiment, accumulator 70 buffers fluctuations in flow of natural gas through inlet 72 without buffering set point changes to pressure, temperature, flow rate, or other characteristics. By way of example, brief variations in the flow of natural gas may include variations in pressure or flow rate caused by a mechanical regulator whereas set point changes to pressure or flow rate may be provided according to a control strategy for the natural gas system.

As shown in FIG. 3B, accumulator 70 includes a flow buffer, shown as baffle 78. In one embodiment, baffle 78 is configured to extend the length of the flow path through accumulator 70, thereby further reducing the prevalence of fluctuations in the flow of natural gas at outlet 74. In another embodiment, baffle 78 is configured to provide additional surface with which the flow of natural gas interacts, thereby further reducing the prevalence of fluctuations in flow of natural gas at outlet 74. According to the exemplary embodiment shown in FIG. 3B, accumulator 70 includes a plurality of baffles 78 arranged parallel to one another. In other embodiments, accumulator 70 includes a single baffle 78 or baffles 78 that are otherwise arranged. Baffles 78 are flat plates in the exemplary embodiment shown in FIG. 3B. In other embodiments, baffles 78 are otherwise shaped. By way of example, baffles 78 may be curved and arranged for form a coil that defines a spiral flow path.

Figure 4:
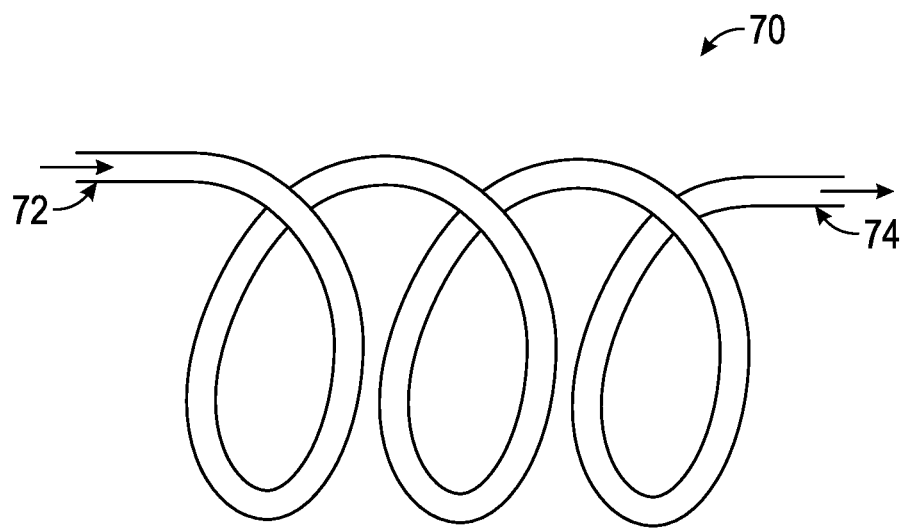

Referring next to the exemplary embodiment shown in FIG. 4, accumulator 70 includes a supplemental length of conduit. As shown in FIG. 4, natural gas flows from inlet 72 to outlet 74 along a length of conduit. In one embodiment, a length of conduit beyond the length of conduit required to couple various components of a natural gas system defines the supplemental length. By way of example, a fuel control module may be separated from an engine by a conduit run distance of fifteen feet, and the fuel control module may be coupled to the engine with a conduit having a length of twenty feet, the difference between the conduit run distance and the conduit length defining the supplemental length of conduit that forms accumulator 70. As shown in FIG. 4, the supplemental length of conduit is coiled. According to an alternative embodiment, the supplemental length of conduit is otherwise arranged (e.g., looped, arranged in a U-shape, routed along a body or frame of a vehicle, etc.).

Figure 5:
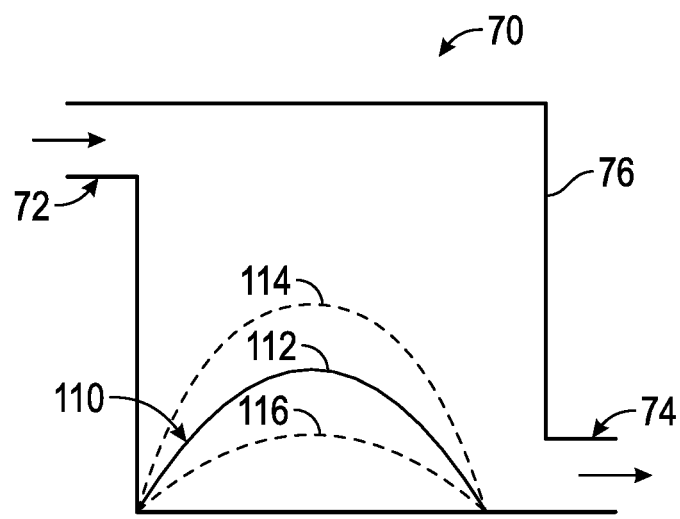

Referring next to the exemplary embodiment shown in FIG. 5, accumulator 70 includes a movable wall 110 positioned within the inner volume of housing 76. Movable wall 110 is actuated to vary the inner volume of housing 76, according to an exemplary embodiment. Changing the inner volume of housing 76 varies a buffer level provided by accumulator 70 (e.g., the inner volume may be decreased to lower the buffer level, the inner volume may be increased to increase the buffer level, etc.). According to an exemplary embodiment, the buffer level may be lowered to reduce the impact of accumulator 70 on the flow of natural gas. In one embodiment, the buffer level of accumulator 70 is lowered to increase responsiveness and facilitate providing the engine with a variable flow of natural gas (e.g., a flow having a flow rate or pressure that varies based on a throttle input, etc.).

In one embodiment, the movable wall 110 is a rigid wall that may be actuated to change the inner volume of housing 76. According to the exemplary embodiment shown in FIG. 5, movable wall 110 is a flexible bladder that may be inflated from position 112 to position 114 or deflated from position 112 to position 116. Inflating the flexible bladder to position 114 may decrease the buffer level of accumulator 70 while deflating the flexible bladder to position 116 may increase the buffer level of accumulator 70. Such inflation or deflation of the flexible bladder may be facilitated by a fluid port (e.g., a hydraulic port, a pneumatic port, etc.) and various accumulators, pumps, valves, or other components. The fluid port may be coupled to an air system of a vehicle.

According to an exemplary embodiment, the inner volume of housing 76 is actively varied (e.g., by inflating and deflating the flexible bladder, by otherwise actuating movable wall 110, etc.) to counter pressure fluctuations in the flow of natural gas at inlet 72. By way of example, a pressure transducer may detect the pressure of the inlet flow of natural gas and provide sensor signals to a controller, and the controller may engage an actuator (e.g., a linear actuator, a rotational actuator, a source of a pressurized fluid, etc.) to generate a pressure wave that interfaces with and dampens the pressure fluctuation.

Figure 6:
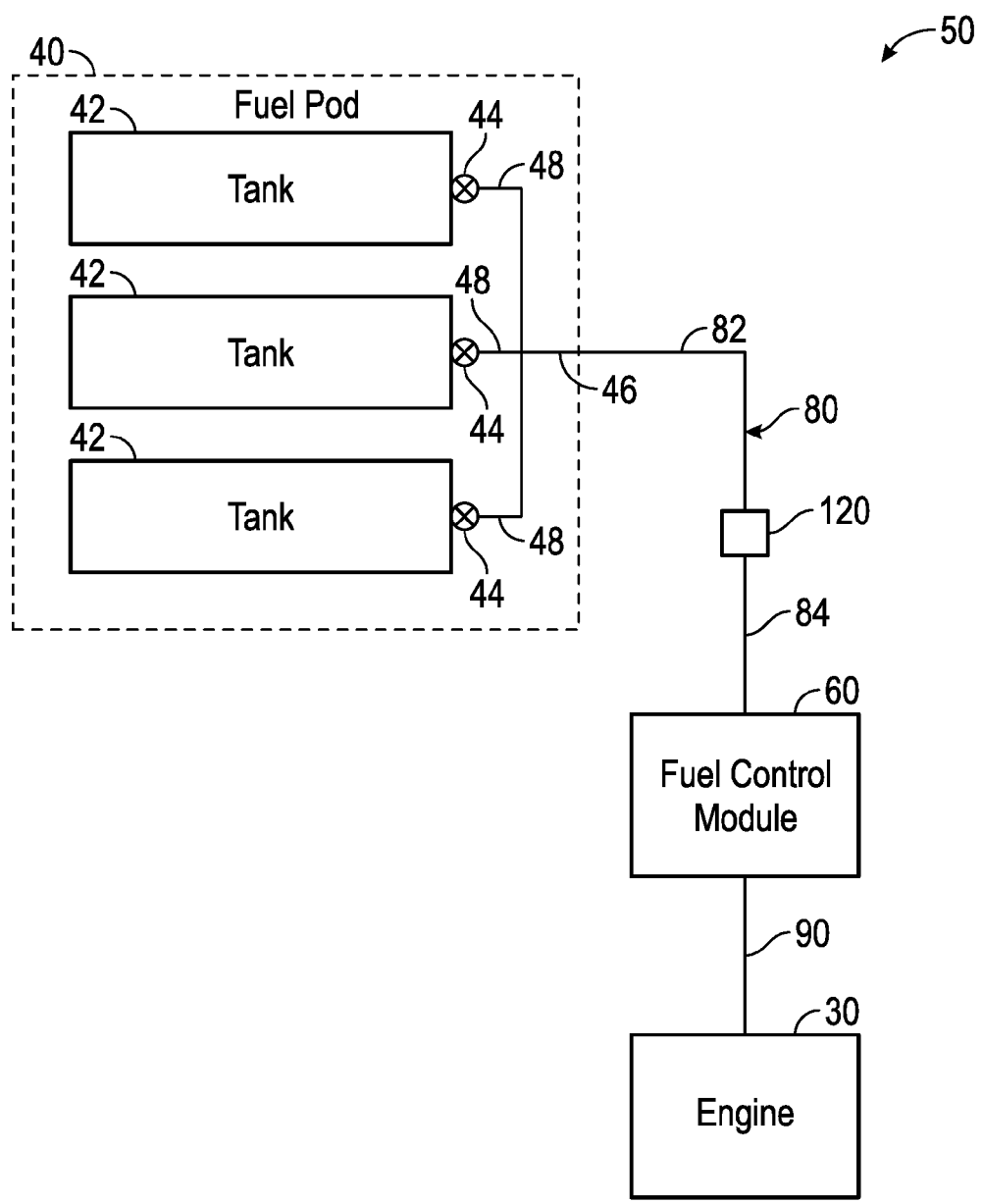
FIGS. 6-7 are schematic views of a natural gas system including a manifold and a fuel pod having a plurality of fuel tanks, according to alternative embodiments.
Figure 7:
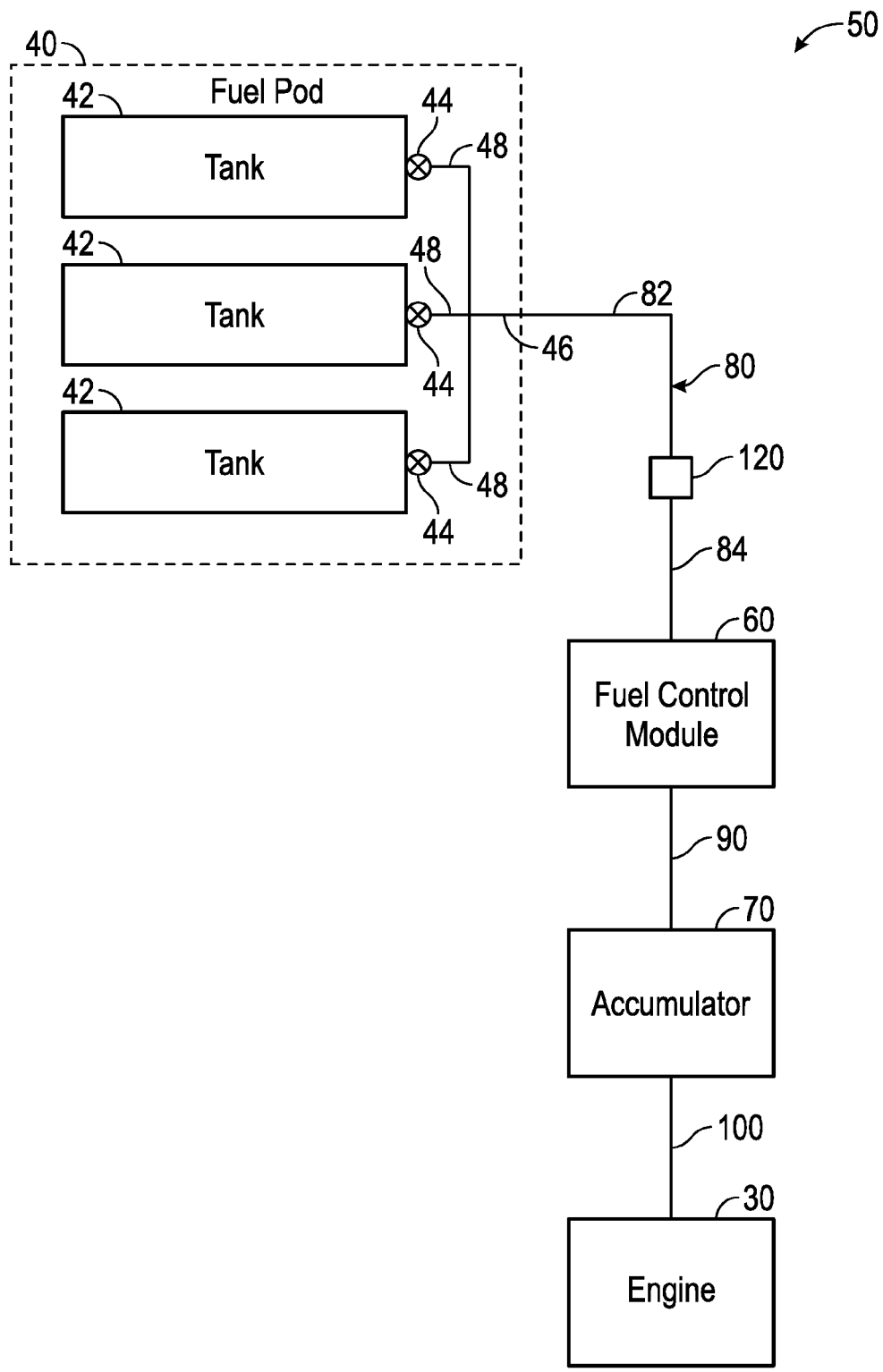

Referring next to the exemplary embodiments shown in FIGS. 6-7, natural gas system 50 includes a manifold 120 disposed along the flow path defined along high-pressure line 80, which couples fuel pod 40 with fuel control module 60. As shown in FIGS. 6-7, a first conduit, shown as high-pressure line 82, couples fuel pod 40 with manifold 120, and a second conduit, shown as high-pressure line 84, couples manifold 120 with fuel control module 60. Manifold 120 includes various components configured to facilitate the operation of natural gas system 50. According to an alternative embodiment, manifold 120 is positioned downstream of fuel control module 60 (e.g., between fuel control module 60 and engine 30, between fuel control module 60 and accumulator 70, between accumulator 70 and engine 30, etc.).

Referring still to FIGS. 6-7, fuel pod 40 includes a plurality of tanks, shown as tanks 42. In other embodiments, fuel pod 40 includes more or fewer tanks 42. Tanks 42 are configured to store natural gas for use in engine 30, according to an exemplary embodiment. As shown in FIGS. 6-7, each tank 42 includes a shutoff valve 44. Shutoff valve 44 allows an operator, user, or other personnel to stop the flow of natural gas from tank 42, according to an exemplary embodiment. As shown in FIGS. 6-7, the flow of natural gas from each tank 42 is combined into a single outlet conduit 46 with a plurality of intermediate conduits 48. According to an exemplary embodiment, the single outlet conduit 46 interfaces with the various other components of natural gas system 50 to provide a flow of natural gas to engine 30. In one embodiment, single outlet conduit 46 is a separate line that is coupled to high-pressure line 80. In another embodiment, single outlet conduit 46 is defined by a portion of high-pressure line 80 (i.e., high-pressure line 82 may couple manifold 120 with a union of the plurality of intermediate conduits 48).

Figure 8:
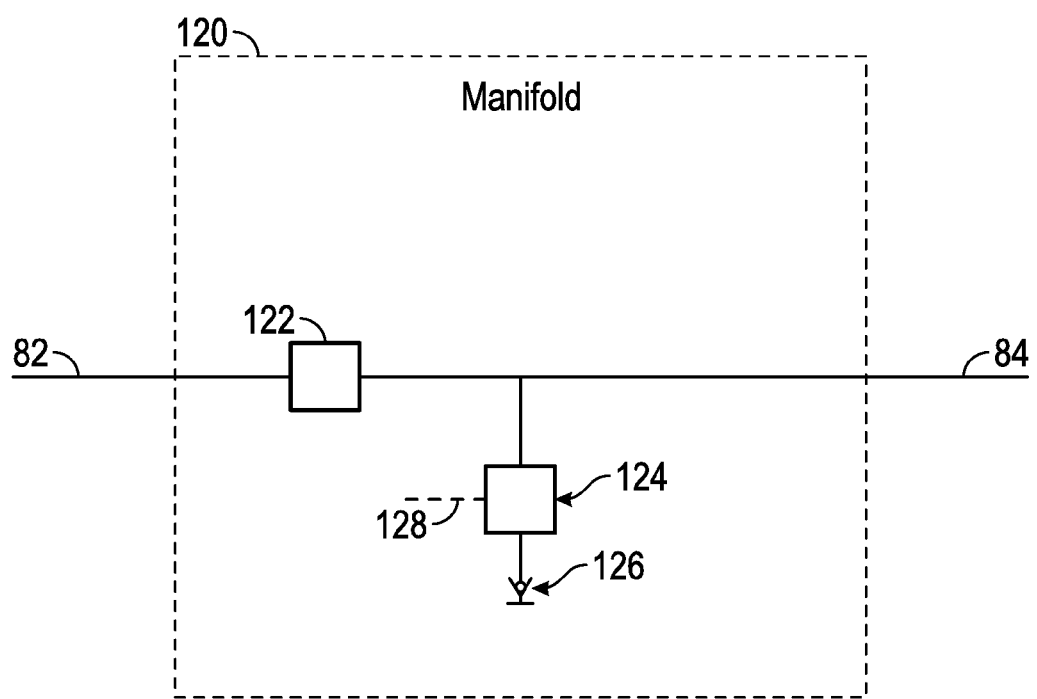
FIG. 8 is a schematic view of a manifold for a natural gas system including a shutoff valve, according to an exemplary embodiment.

As shown in FIG. 8, manifold 120 includes a shutoff valve 122 disposed along the flow path between fuel pod 40 and fuel control module 60. Closing shutoff valve 122 stops the flow of natural gas from fuel pod 40. In one embodiment, shutoff valve 122 includes a ball valve. In other embodiments, shutoff valve 122 includes another type of valve (e.g., a gate valve, etc.). Shutoff valve 122 is manually operated, according to an exemplary embodiment. According to an alternative embodiment, shutoff valve 122 is actuated electronically (e.g., with a solenoid, etc.). Such electronic actuation may occur upon user input or as part of a shutoff valve control strategy.

In one embodiment, natural gas system 50 defines at least a portion of the fuel system for a vehicle. Fuel pod 40 may be positioned along the roof of a body assembly, according to an exemplary embodiment. In other embodiments, fuel pod 40 is positioned behind the drum on a concrete mixer truck. In still other embodiments, fuel pod 40 is coupled to a tailgate of a vehicle or still otherwise positioned. According to an exemplary embodiment, an operator may isolate each of the plurality of tanks 42 by closing shutoff valve 122. The position of shutoff valve 122 facilitates simultaneously stopping the flow of natural gas from each tank 42 of fuel pod 40. According to an exemplary embodiment, manifold 120 is positioned near fuel pod 40, thereby isolating a greater portion of the high-pressure natural gas system.

In the event of a combustion event occurring onboard the vehicle, an operator may need to isolate each tank 42. Conventionally, where several natural gas tanks are positioned along the roof of a vehicle, an operator must climb to the roof of the vehicle and close valves to individually stop the flow of fuel from the tanks. Shutoff valve 122 facilitates the simultaneous disengagement of tanks 42, thereby reducing the need for an operator to shut off each tank 42 individually. In one embodiment, manifold 120 is positioned such that an operator standing alongside the vehicle may actuate shutoff valve 122, thereby reducing the need for the operator to board the vehicle to stop the flow of natural gas from tanks 42.

According to the exemplary embodiment shown in FIG. 8, manifold 120 includes a defueling valve 124 disposed along the flow path between fuel pod 40 and fuel control module 60. Defueling valve 124 facilitates removing fuel from fuel pod 40, according to an exemplary embodiment. According to an alternative embodiment, defueling valve 124 allows an operator to perform a pressure equalization and transfer natural gas to another vehicle. Defueling valve 124 is positioned along the outer surface of a body assembly for a vehicle, according to an exemplary embodiment. As shown in FIG. 8, defueling valve 124 engages a fitting 126 (e.g., a quick-release fitting, etc.) and a vent 128 to facilitate defueling and pressure equalization. In one embodiment, defueling valve 124 is a three-way ball valve having a first port exposed to high-pressure line 82, a second port in fluid communication with vent 128, and a third port exposed to fitting 126. The three-way ball valve facilitates venting natural gas pressure (e.g., through vent 128, etc.) within a hose used to defuel or perform a pressure equalization, according to an exemplary embodiment.

Figure 9:
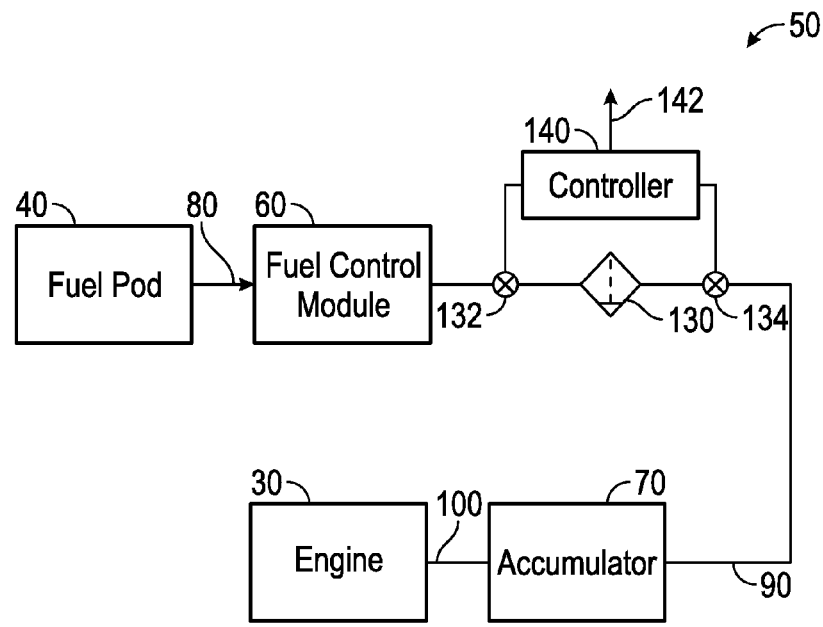
FIGS. 9-10 are schematic views of a natural gas system including a pair of pressure transducers and a filter, according to alternative embodiments.
Figure 10:
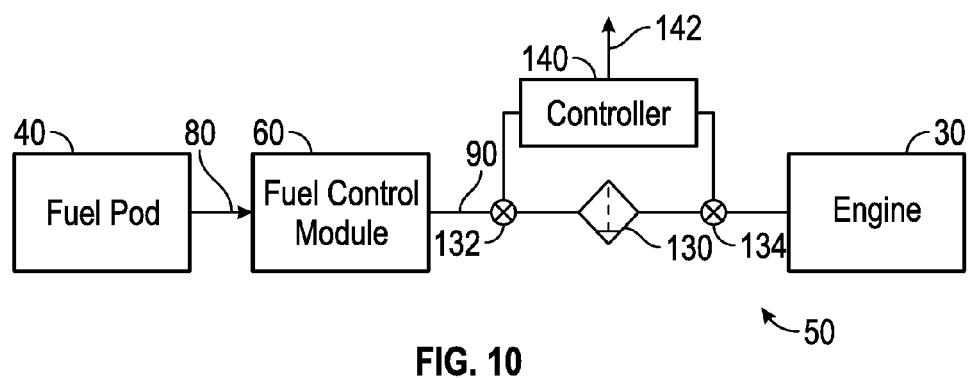

Referring next to the exemplary embodiments shown in FIGS. 9-10, natural gas system 50 includes a filter, shown as high-pressure coalescing filter 130, positioned downstream of fuel control module 60. As shown in FIG. 9, high-pressure coalescing filter 130 is positioned between fuel control module 60 and accumulator 70. As shown in FIG. 10, high-pressure coalescing filter 130 is positioned between fuel control module 60 and engine 30. In other embodiments, high-pressure coalescing filter 130 is otherwise positioned (e.g., upstream of fuel control module 60, etc.).

According to an exemplary embodiment, high-pressure coalescing filter 130 removes contaminants (e.g., oil, debris, etc.) from the flow of natural gas before it reaches engine 30. As shown in FIGS. 9-10, natural gas system 50 includes a first pressure transducer, shown as pressure transducer 132, positioned upstream of high-pressure coalescing filter 130 and a second pressure transducer, shown as pressure transducer 134, positioned downstream of high-pressure coalescing filter 130. Pressure transducer 132 and pressure transducer 134 measure the upstream and downstream pressure of the natural gas flowing through high-pressure coalescing filter 130, respectively.

As shown in FIGS. 9-10, natural gas fuel system 50 includes a controller 140. According to an exemplary embodiment, controller 140 is coupled to pressure transducer 132 and pressure transducer 134. In one embodiment, pressure transducer 132 and pressure transducer 134 are configured to provide sensor signals to controller 140 indicating the upstream and downstream pressure of the natural gas flowing through high-pressure coalescing filter 130, respectively. In one embodiment, controller 140 is configured to evaluate the sensors signals from pressure transducer 132 and pressure transducer 134 to determine a pressure differential across high-pressure coalescing filter 130. As high-pressure coalescing filter 130 removes contaminants from the flow of natural gas, high-pressure coalescing filter 130 begins to clog, and the pressure differential increases. According to an exemplary embodiment, controller 140 is configured to provide a signal 142 when the pressure differential exceeds a threshold value (e.g., 50 PSI, 90 PSI, etc.) (i.e., controller 140 provides a service signal). According to an alternative embodiment, signal 142 encodes data relating to an observed pressure differential (e.g., 20 PSI, etc.) across high-pressure coalescing filter 130.

In one embodiment, signal 142 is provided to a user interface (e.g., a display, a warning light, etc.) to alert an operator that high-pressure coalescing filter requires service or repair. In other embodiments, signal 142 is provided to still another system or device (e.g., a remote system that monitors the performance of the vehicle, a control system configured to limit the performance of the vehicle by entering a "limp mode" to prevent damage once the pressure differential exceeds the threshold value, etc.). Sending a service signal, a signal that encodes data, or providing a signal to another system reduces the likelihood that damage will occur to various components of the vehicle (e.g., engine 30, fouling of sensors or plugs, etc.) due to operating natural gas system 50 with an ineffective or clogged high-pressure coalescing filter 130.

Figure 11:
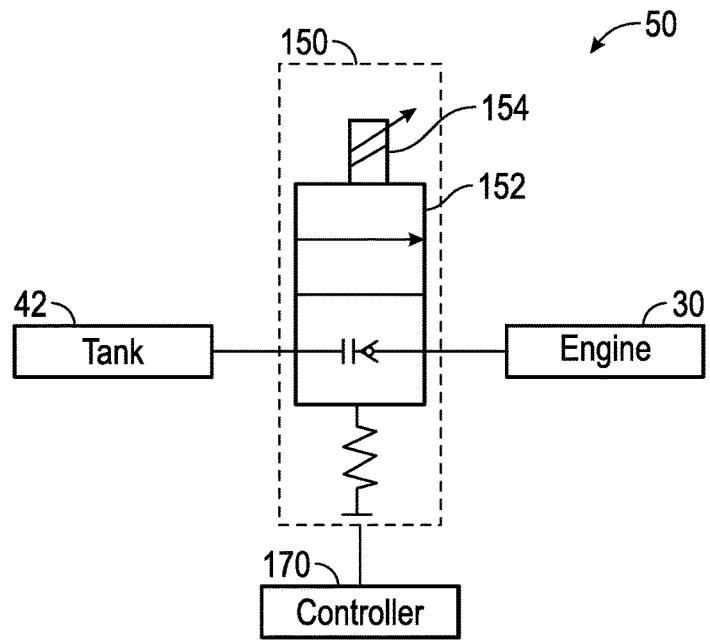
FIGS. 11-12 are schematic views of a natural gas system including a valve that regulates the flow of natural gas, according to alternative embodiments.
Figure 12:
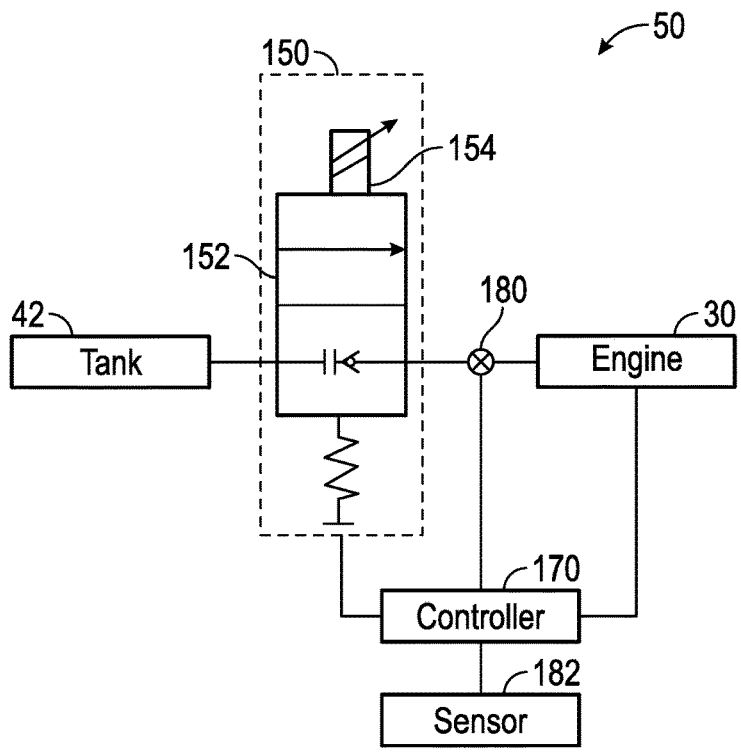

Referring next to the exemplary embodiments shown in FIGS. 11-12, natural gas system 50 includes a valve 150 disposed along a flow path defined by a conduit coupling tank 42 and engine 30. Valve 150 replaces a traditional mechanical regulator, according to an exemplary embodiment. In one embodiment, valve 150 is actively adjustable and reduces the flow rate fluctuations common with fixed, mechanical regulators. Such flow rate fluctuations occur as a function of the pressure within tank 42 and may generate power fluctuations in engine 30. Tank 42 provides a supply flow of natural gas. According to an exemplary embodiment, valve 150 is configured to provide a regulated flow of natural gas to engine 30 by adjusting the supply flow of natural gas.

As shown in FIGS. 11-12, a controller 170 is coupled to valve 150. According to an exemplary embodiment, controller 170 is configured to evaluate a target pressure (e.g., 110 PSI, etc.) for the regulated flow of natural gas and selectively engage valve 150 such that engine 30 receives natural gas at the target pressure. Selectively engaging valve 150 accounts for pressure variations due to decreased pressure in tank 42, losses due to interaction between the natural gas and the conduits and components of natural gas system 50, or still other conditions.

As shown in FIGS. 11-12, valve 150 includes a movable valve element 152 (e.g., a valve spool, a poppet, etc.) that is engaged by an actuator, shown as solenoid 154 (e.g., a proportional solenoid, etc.). Movable valve element 152 is movable between a closed position, shown in FIGS. 11-12, and various open positions where natural gas flows through valve 150. The flow rate, pressure, or other characteristic of the regulated flow of natural gas may vary based on the position of moveable valve element 152. As shown in FIGS. 11-12, movable valve element 152 is biased (e.g., with a resilient member) into a check valve configuration, where fluid flow through valve 150 is stopped.

According to an exemplary embodiment, valve 150 is coupled to a controller, shown as controller 170. In one embodiment, controller 170 is coupled to solenoid 154. Controller 170 may send and receive signals (e.g., electrical pulses, etc.) to or from solenoid 154. According to the embodiment shown in FIGS. 11-12, controller 170 is configured to send a command signal to solenoid 154. Solenoid 154 may actuate moveable valve element 152 as a function of the command signal. According to an exemplary embodiment, controller 170 sends command signals to solenoid 154 such that engine 30 receives natural gas at the target pressure.

In one embodiment, controller 170 receives or retrieves the target pressure for the regulated flow of natural gas. By way of example, an operator may provide a target pressure via a user interface. By way of another example, a remote operation system may provide the target pressure to controller 170. By way of still another example, the target pressure may be stored in a memory (i.e., the target pressure may be retrieved by controller 170). Controller 170 may evaluate the target pressure and selectively engage valve 150.

As shown in FIG. 12, natural gas system 50 includes a sensor, shown as pressure transducer 180. Pressure transducer 180 is disposed along the flow path downstream of valve 150. According to an exemplary embodiment, pressure transducer 180 is configured to provide sensor signals relating to the pressure of the regulated flow of natural gas. According to an exemplary embodiment, pressure transducer 180 is positioned along the flow path near engine 30 such that pressure transducer 180 reads the pressure of the natural gas as it flows into engine 30. By way of example, the pressure of the regulated flow of natural gas may be at the target pressure near the output of valve 150 but decrease due to line losses as it travels to engine 30. Positioning pressure transducer 180 along the flow path near engine 30 reduces the error that may otherwise be associated with such line loses and reduces the risk of providing engine 30 with a flow of natural gas below the target pressure.

In one embodiment, controller 170 is configured to evaluate the sensor signals as part of a closed-loop control strategy. By way of example, controller 170 may be configured to evaluate the sensor signals from pressure transducer 180 and compare the pressure of the regulated flow of natural gas to the target pressure. Controller 170 may be configured to engage solenoid 154 while the pressure observed by pressure transducer 180 differs from the target pressure. Such a closed-loop control strategy may employ a deadband pressure variation (e.g., 5 PSI, etc.). Controller 170 is configured to not engage solenoid 154 when the pressure observed by pressure transducer 180 falls within the deadband pressure variation, according to one embodiment. Employing a deadband pressure variation reduces actuation of solenoid 154 and limits premature wear on the components of natural gas system 50, according to one embodiment. In other embodiments, controller 170 is configured to employ an open-loop control strategy and engage valve 150 without regard for the pressure of the regulated flow of natural gas.

As shown in FIG. 12, natural gas system 50 includes a sensor 182 that is coupled to controller 170 and configured to provide sensor signals. In one embodiment, sensor 182 is a throttle position sensor configured to provide information relating to a requested throttle input for a vehicle (e.g., a refuse truck, a concrete mixer truck, a military truck, etc.). According to the embodiment shown in FIG. 12, controller 170 is coupled to engine 30. By way of example, controller 170 may be coupled to a controller area network bus of engine 30 (e.g., part of an engine management system, etc.). Various signals relating to an engine condition of engine 30 may be provided to controller 170. In one embodiment, the engine condition includes at least one of a current fuel consumption demand, whether the engine is running lean or rich, and a signal from a post-combustion oxygen sensor.

According to one embodiment, controller 170 is configured to determine the target pressure using information from at least one of engine 30 and sensor 182. In one embodiment, controller 170 is configured to determine the target pressure based on the requested throttle input. By way of example, the target pressure may increase such that engine 30 receives more fuel when an operator presses a throttle pedal. In another embodiment, controller 170 is configured to determine the target pressure based on an engine condition (e.g., a current fuel consumption demand, etc.). In still another embodiment, controller 170 determines the target pressure using an offset provided by an operator. By way of example, an operator may manually control the target pressure or may engage a "high idle" mode and increase the target pressure above that required based on the current engine conditions.

Figure 13:
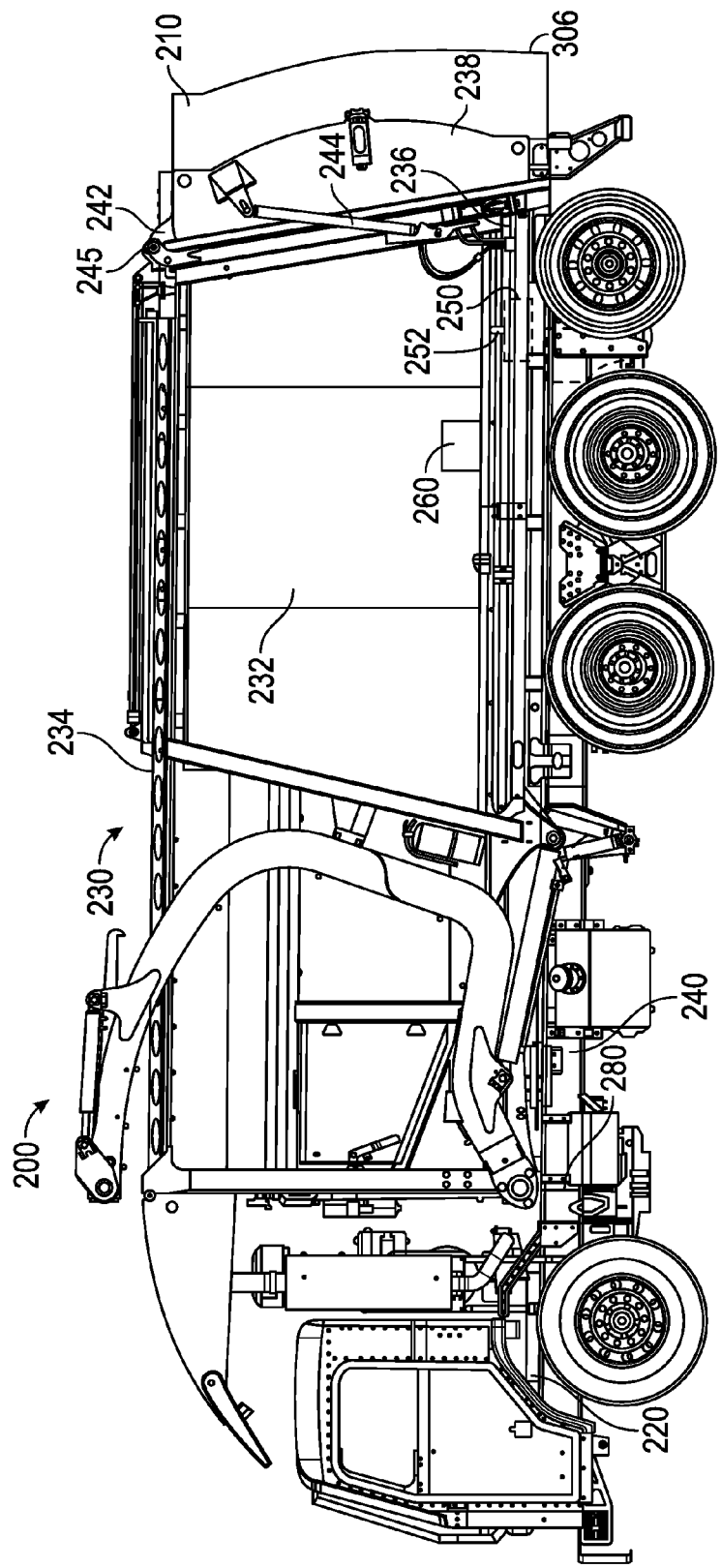
FIG. 13 is a side plan view of a refuse vehicle including a fuel pod, a valve, a user access panel, and a pressure regulator, according to an exemplary embodiment.
Figure 14A:
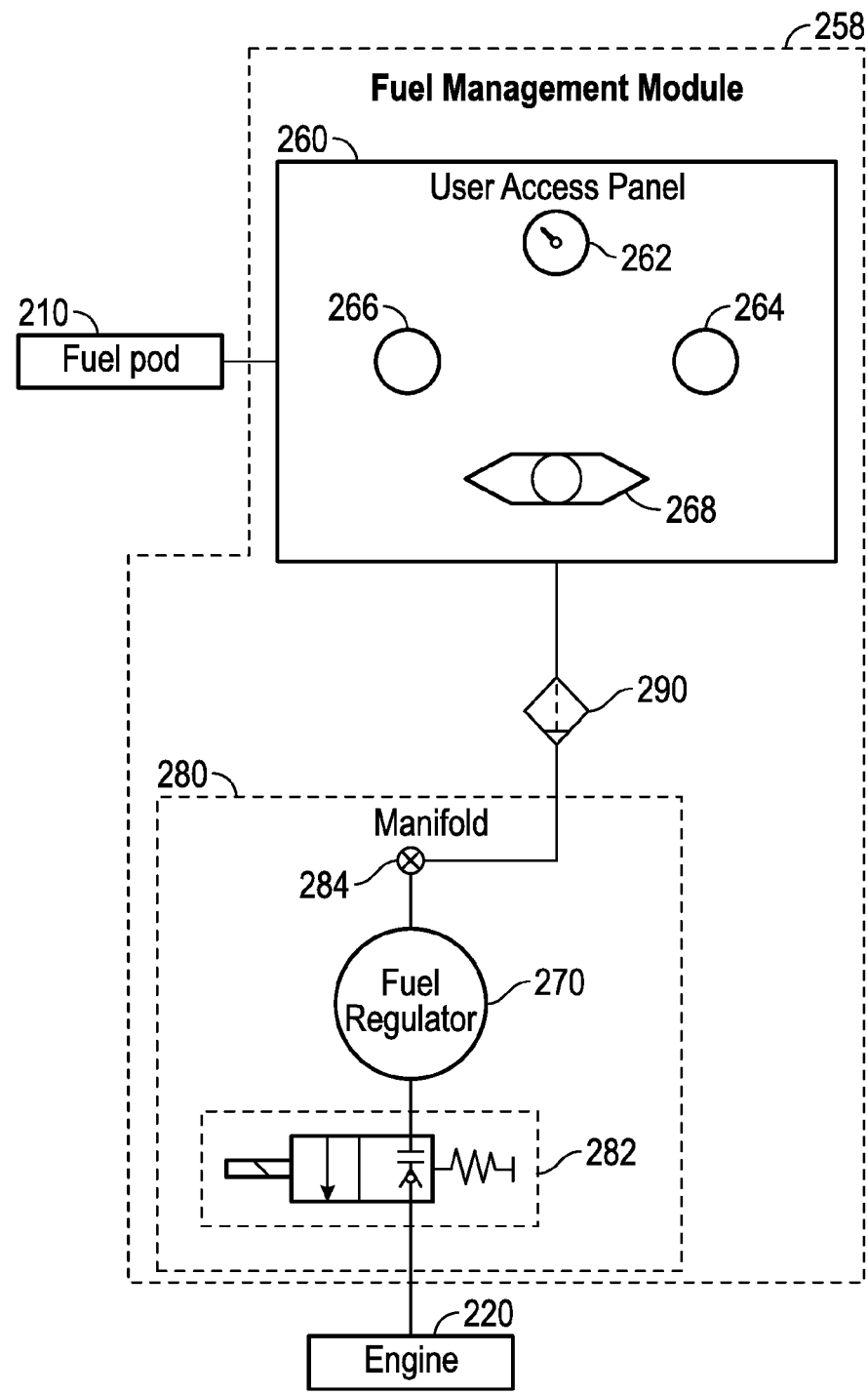
FIG. 14A is a schematic view of a natural gas system including a user access panel that is separated from a fuel regulator, according to an exemplary embodiment.
Figure 14B:
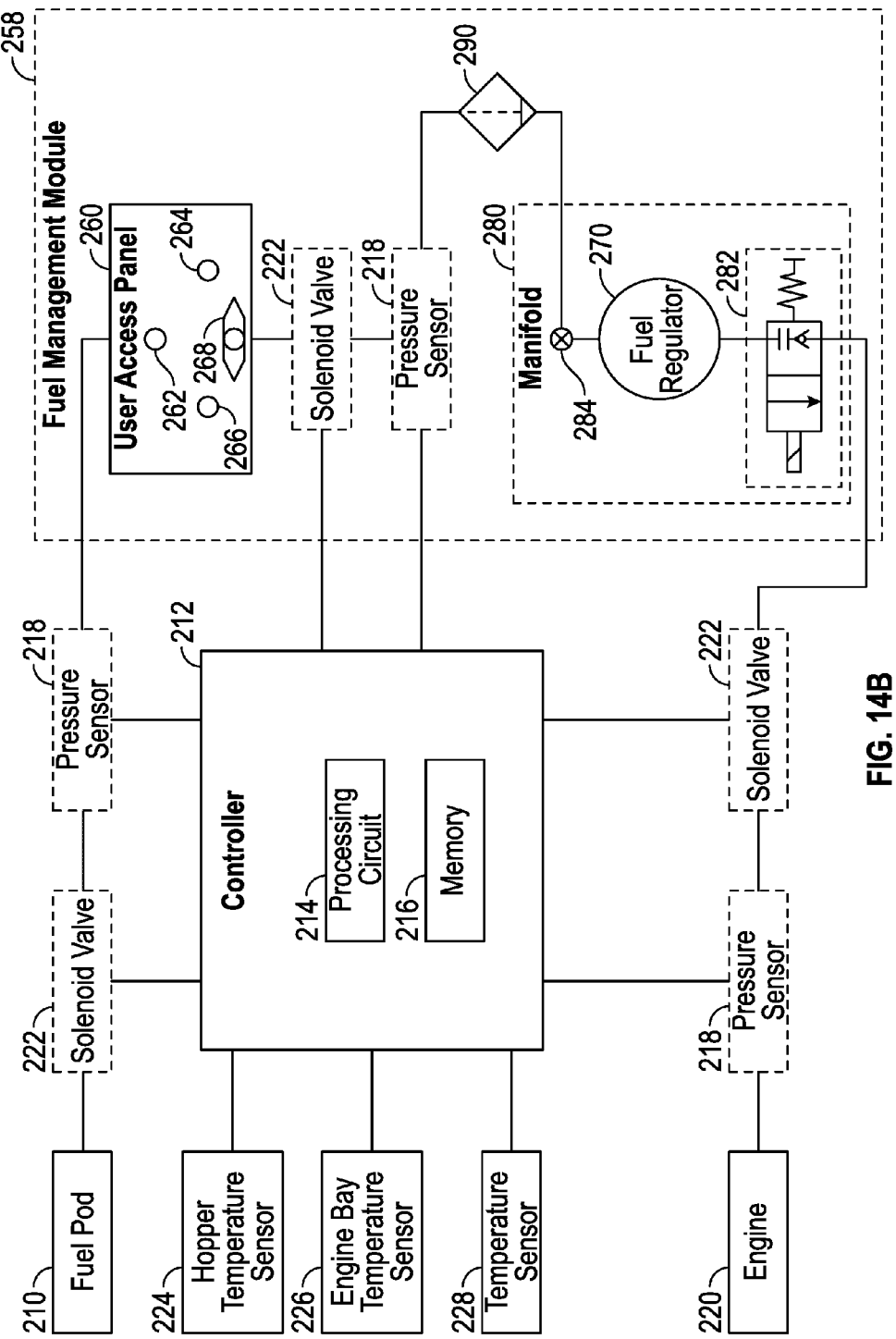
FIG. 14B is a schematic view of a natural gas system including a controller, according to an exemplary embodiment.

Referring next to the exemplary embodiments shown in FIGS. 13-14B, a vehicle, shown as refuse truck 200, includes a fuel pod 210 configured to provide natural gas to power an engine 220. According to an alternative embodiment, the vehicle is another type of vehicle (e.g., a concrete mixer truck, a military truck, etc.). As shown in FIG. 13, refuse truck 200 includes a body assembly (e.g., a hopper, etc.), shown as body assembly 230, coupled to a frame 240. According to an exemplary embodiment, body assembly 230 includes a plurality of sidewalls 232, an upper wall 234, and a fender panel, shown as fender 236. As shown in FIG. 13, fender 236 is positioned along a lower portion of sidewall 232.

As shown in FIG. 13, a tailgate 238 is coupled to body assembly 230 with a hinge 242 having a pivot point 245. Tailgate 238 is movable about pivot point 245 by an actuator, shown as a linear hydraulic actuator 244. Tailgate 238 is configured to be moveable about pivot point 245 by actuator 244 between a closed position, in which tailgate 238 closes an open back end of body assembly 230, and an open position, in which tailgate 238 allows access to the interior of body assembly 230 through the back end of body assembly 230.

According to an exemplary embodiment, fuel pod 210 is mounted on tailgate 238. Fuel pod 210 includes a plurality of natural gas fuel tanks, according to an exemplary embodiment. Fuel pod 210 is coupled to engine 220 with a plurality of conduits that define a flow path. According to an exemplary embodiment, a fuel regulator 270 is disposed along the flow path and configured to regulate a flow of natural gas from fuel pod 210.

As shown in FIG. 13, refuse truck 200 includes a valve, shown as shutoff valve 250, disposed along the flow path between fuel pod 210 and fuel regulator 270. Shutoff valve 250 includes a lever, shown as lever 252, that is configured to actuate shutoff valve 250 and control the flow of natural gas from fuel pod 210. In other embodiments, shutoff valve 250 is remotely actuatable (e.g., shutoff valve may include a solenoid valve, etc.). According to an exemplary embodiment, shutoff valve 250 is coupled to a lower portion of body assembly 230 such that an operator standing alongside refuse truck 200 may isolate fuel pod 210 by engaging shutoff valve 250. As shown in FIG. 13, shutoff valve 250 is positioned underneath fender 236. In one embodiment, one or more covers are associated with shutoff valve 250 (e.g., permanently disposed over or across, selectively repositionable over or across, etc.). The one or more covers may include or interface with a lock, latch, or other mechanism configured to selectively inhibit access to shutoff valve 250. Such a lock, latch, or other mechanism may be used to facilitate a maintenance or service operation of refuse truck 200 (e.g., as part of a lockout/tag out procedure to prevent unintended or undesired fuel activation during a maintenance or service operation, etc.).

Referring still to the exemplary embodiment shown in FIG. 13, refuse truck 200 includes a user access panel 260. As shown in FIG. 13, user access panel 260 is positioned along a lower portion of body assembly 230 such that an operator standing alongside refuse truck 200 may engage one or more components of user access panel 260. In one embodiment, user access panel 260 provides a user interface, while various components of the natural gas system (e.g., fuel regulator 270, etc.) are positioned laterally inboard (e.g., between frame rails of frame 240, etc.). Positioning various components of the natural gas system (e.g., fuel regulator 270, etc.) laterally inboard of user access panel 260 facilitates mounting still other components along the outer surface of body assembly 230 without limiting an operator's ability to control the natural gas system. Refuse truck 200 spaces large components and associated fittings of fuel regulator 270 from exposed areas of body assembly 230, thereby allowing use of the exposed area for other purposes (e.g., to provide storage, etc.). According to an alternative embodiment, user access panel 260 is positioned within a fuel storage unit.

Referring next to FIG. 14A, refuse truck 200 includes a fuel management module, shown as fuel management module 258. As shown in FIG. 14A, fuel management module 258 includes user access panel 260 and a manifold 280. Fuel management module 258 may be positioned immediately behind an operator cab of refuse truck 200. User access panel 260 is disposed along a flow path between fuel pod 210 and engine 220. Fuel regulator 270 is included as part of manifold 280. In one embodiment, manifold 280 is positioned near engine 220, thereby reducing the impact of post-regulation pressure losses and increasing the likelihood of providing natural gas to engine 220 at a target or preset pressure.

According an exemplary embodiment, manifold 280 includes a shutoff valve, shown as shutoff valve 282, and a pressure transducer, shown as pressure transducer 284. As shown in FIG. 14A, shutoff valve 282 includes a normally-closed solenoid valve positioned to selectively disengage the natural gas system from engine 220. Shutoff valve 282 is engaged and disengaged with a controller, according to an exemplary embodiment. In some embodiments, shutoff valve 282 prevents the flow of natural gas to engine 220 when refuse truck 200 is turned off. Pressure transducer 284 is positioned upstream of fuel regulator 270 and provides sensor signals (e.g., digital signals to a controller or gauge, analog signals to a controller or gauge, etc.) relating to the pressure of the natural gas in fuel pod 210. Pressure transducer 284 provides a signal (e.g., a signal of between 0.5 volts and 4.5 volts, etc.) relating to the pressure of the natural gas in fuel pod 210 to a gauge positioned in a cab of refuse truck 200, according to an exemplary embodiment. According to the exemplary embodiment shown in FIG. 14A, a filter 290 is positioned along the flow path between fuel pod 210 and engine 220.

Referring still to FIG. 14A, user access panel 260 includes a high-pressure fuel gauge 262, a first fuel receptacle 264 (e.g., a NGV1 fuel receptacle, etc.), a second fuel receptacle 266 (e.g., a transit fill fuel receptacle, etc.), and a manual shutoff valve 268. As shown in FIG. 14A, high-pressure fuel gauge 262 is an analog gauge configured to indicate a fill level (e.g., a pressure, etc.) of the natural gas within fuel pod 210. In other embodiments, high-pressure fuel gauge 262 receives a signal from a pressure transducer (e.g., pressure transducer 284, etc.) and indicates a fill level of the natural gas within fuel pod 210.

Referring next to FIG. 14B, refuse truck 200 includes a fault condition management system. In one embodiment, the fault condition management system is configured to monitor one or more operating conditions associated with refuse truck 200 and respond to reduce the risk of damage to refuse truck 200 upon detecting a fault condition. Such a fault condition may occur due to an unintended combustion event within an engine bay of refuse truck 200, due to material combusting within a hopper of body assembly 230 of refuse truck 200, and/or due to damage to one or more components of the natural gas fuel system (e.g., due to a collision with a tree or other object within a surrounding environment, etc.), among other alternatives.

As shown in FIG. 14B, the fault condition management system includes a controller 212. Controller 212 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the embodiment shown in FIG. 14B, controller 212 includes a processing circuit 214 and a memory 216. Processing circuit 214 may include an ASIC, one or more FPGAs, a DSP, circuits containing one or more processing components, circuitry for supporting a microprocessor, a group of processing components, or other suitable electronic processing components.

In some embodiments, controller 212 is configured to execute computer code stored in memory 216 to facilitate the activities described herein. Memory 216 may be any volatile or non-volatile computer-readable storage medium capable of storing data or computer code relating to the activities described herein. In one embodiment, memory 216 has computer code modules (e.g., executable code, object code, source code, script code, machine code, etc.) configured for execution by processing circuit 214. In some embodiments, controller 212 represents a collection of processing devices (e.g., servers, data centers, etc.). In such cases, processing circuit 214 represents the collective processors of the devices, and memory 216 represents the collective storage devices of the devices.

According to the exemplary embodiment shown in FIG. 14B, the fault condition management system of refuse truck 200 includes a pressure sensor 218. Controller 212 may be configured to send signals to, and receive signals from, pressure sensor 218. In one embodiment, pressure sensor 218 is positioned to provide pressure data relating to a pressure of natural gas between fuel pod 210 and engine 220. In one embodiment, pressure sensor 218 is positioned along a flow path between fuel pod 210 and engine 220 near fuel pod 210. In another embodiment, pressure sensor 218 is positioned near engine 220. In yet another embodiment, pressure sensor 218 is otherwise positioned between fuel pod 210 and engine 220. By way of example, pressure sensor 218 may be positioned within fuel management module 258. As shown in FIG. 14B, refuse truck 200 includes a plurality of pressure sensors 218 selectively positioned along the flow path between fuel pod 210 and engine 220. In other embodiments, refuse truck 200 includes only one pressure sensor 218. In some embodiments, pressure transducer 284 positioned within manifold 280 provides pressure data to controller 212. Controller 212 may evaluate pressure data provided by pressure transducer 284 in addition to pressure data provided by pressure sensor 218 (i.e., refuse truck 200 may include both one or more pressure sensors 218 and pressure transducer 284, etc.). In other embodiments, refuse truck 200 includes only pressure transducer 284 (i.e., does not include other pressure sensors 218, etc.).

Referring still to FIG. 14B, the fault condition management system of refuse truck 200 includes a plurality of temperature sensors. Controller 212 may be configured to send signals to, and receive signals from, the temperature sensors. The temperature sensors may be positioned to provide temperature data relating to the temperature of one or more environments associated with refuse truck 200 and/or the temperature of one or more components of refuse truck 200. As shown in FIG. 14B, refuse truck 200 includes a temperature sensor, shown as hopper temperature sensor 224, that is coupled to body assembly 230 of refuse truck 200. Hopper temperature sensor 224 may be positioned to monitor a temperature of a hopper associated with body assembly 230 of refuse truck 200. Refuse truck 200 further includes a temperature sensor, shown as engine bay temperature sensor 226, that is coupled to body assembly 230 of refuse truck 200. Engine bay temperature sensor 226 may be positioned to monitor a temperature of an engine bay associated with body assembly 230 of refuse truck 200. Refuse truck 200 may include a plurality of hopper temperature sensors 224 and a plurality of engine bay temperature sensors 226. In other embodiments, refuse truck 200 includes either one or more hopper temperature sensors 224 or one or more engine bay temperature sensors 226. In still other embodiments, refuse truck 200 includes still other temperature sensors, shown as temperature sensors 228, positioned to provide temperature data relating to the temperature of still environments associated with refuse truck 200 and/or the temperature of still other components of refuse truck 200. In yet other embodiments, refuse truck 200 does not include such temperature sensors. In further embodiments, controller 212 may be configured to send signals to, and receive signals from, other types of sensors positioned to provide data relating to an environment associated with refuse truck 200. By way of example, the sensors may include one or more cameras (e.g., infrared cameras, etc.), one or more pieces of smoke detection equipment, and/or still another device. Refuse truck 200 may include such sensors in addition to or in place of the temperature sensors. Controller 212 may interact with, and make decisions based upon information from, such sensors according to the various temperature sensor-based control schemes outlined herein.

As shown in FIG. 14B, refuse truck 200 includes a shutoff valve, shown as solenoid valve 222. In one embodiment, solenoid valve 222 includes a spring-biased spool valve. Solenoid valve 222 may be provided in addition to or in place of shutoff valve 282. Controller 212 may control the operation of solenoid valve 222 to selectively restrict the flow of fuel to engine 220 when refuse truck 200 is turned off. Controller 212 may be coupled to solenoid valve 222 and configured to control the operation thereof. In one embodiment, solenoid valve 222 is configured to be remotely actuated (e.g., by controller 212, etc.) and thereby selectively restrict (e.g., terminate, etc.) the flow of natural gas between fuel pod 210 to engine 220. In one embodiment, solenoid valve 222 is positioned along the flow path between fuel pod 210 and engine 220 near fuel pod 210 (e.g., to prevent fuel from flowing out of fuel pod 210 and into one or more conduits toward engine 220, etc.). In another embodiment, solenoid valve 222 is positioned along the flow path between fuel pod 210 and engine 220 near engine 220. In yet another embodiment, solenoid valve 222 is otherwise positioned along the flow path between fuel pod 210 and engine 220.

Solenoid valve 222 may be protectively secured to or within refuse truck 200 along the flow path between fuel pod 210 and engine 220. By way of example, solenoid valve 222 may be disposed within a portion of tailgate 238, positioned within a portion of body assembly 230, and/or covered by a protective shield. Solenoid valve 222 may thereby be positioned or protected to reduce the risk of damage thereto (e.g., from debris, from collisions, etc.).

According to an exemplary embodiment, solenoid valve 222 is a normally-closed solenoid valve. In one embodiment, solenoid valve 222 is biased (e.g., with a spring or other resilient member, etc.) into a closed orientation such that it limits the flow of fuel therethrough. Controller 212 may activate solenoid valve 222 by providing a command signal (e.g., a voltage, etc.) or by ceasing the transmission of a command signal, according to various embodiments. In embodiments where solenoid valve 222 is a normally-closed solenoid valve, the command signal may actuate solenoid valve 222 into an open orientation, allowing the flow of fuel therethrough. Controller 212 may continue to provide the command signal during normal operation of refuse truck 200 and activate solenoid valve 222 into a closed orientation by terminating the command signal transmission (e.g., as part of a solenoid actuation strategy, in response to refuse truck 200 being turned off, etc.). In other embodiments, controller 212 is configured to provide a command signal to activate solenoid valve 222 into an open orientation and provide a command signal to activate solenoid valve 222 into a closed orientation. Solenoid valve 222 may selectively permit the flow of fuel between fuel pod 210 and engine 220 when in the open orientation and selectively restrict the flow of fuel between fuel pod 210 and engine 220 when in the closed orientation. According to an exemplary embodiment, solenoid valve 222 is not an excess flow valve (i.e., not a valve configured to close in response to a high flow condition caused by a downstream conduit being pierced, separated, or otherwise damaged, etc.).

According to an exemplary embodiment, controller 212 is configured to monitor the pressure of the natural gas flowing through one or more conduits between fuel pod 210 and engine 220. By way of example, controller 212 may be configured to evaluate the pressure data provided by pressure sensor 218. In one embodiment, controller 212 is configured to compare the pressure of a natural gas fuel within one or more of the conduits coupling fuel pod 210 to engine 220 to a pressure threshold. The pressure threshold may be related to the normal operating pressure of the natural gas fuel between fuel pod 210 and fuel management module 258 (e.g., approximately 200-3,600 PSI, etc.). By way of example, the pressure threshold may be may be equal to the normal operating pressure of the natural gas fuel between fuel pod 210 and fuel management module 258 (e.g., approximately 200-3,600 PSI, etc.) or may be above or below the normal operating pressure of the natural gas fuel between fuel pod 210 and fuel management module 258 (e.g., to provide a deadband operating zone and permit limited pressure fluctuations, etc.). The pressure threshold may be related to the normal operating pressure of the natural gas fuel between fuel management module 258 and engine 220 (e.g., approximately 80-150 PSI, approximately 125 PSI, etc.). By way of example, the pressure threshold may be may be equal to the normal operating pressure of the natural gas fuel between fuel management module 258 and engine 220 (e.g., approximately 80-150 PSI, etc.) or may be above or below the normal operating pressure of the natural gas fuel between fuel management module 258 and engine 220 (e.g., to provide a deadband operating zone and permit limited pressure fluctuations, etc.). Controller 212 may thereby set the pressure threshold in response to the position of pressure sensor 218 (e.g., upstream of fuel management module 258, downstream of fuel management module 258, etc.). In one embodiment, controller 212 is configured to identify a fault condition in response to the pressure within the one or more lines coupling fuel pod 210 to engine 220 falling below the pressure threshold (e.g., falling below a discrete pressure threshold, falling below a low value of a pressure threshold range, etc.). Controller 212 may be configured to deactivate solenoid valve 222 (e.g., actuate solenoid valve 222 toward or into a closed orientation, stop providing a command signal to solenoid valve 222, etc.) in response to identifying the fault condition.

A fault condition relating to the pressure in one or more lines coupling fuel pod 210 to engine 220 falling below the pressure threshold may define a pressure fault condition. The pressure fault condition may occur due to damage to one or more lines coupling fuel pod 210 to engine 220. By way of example, one or more of the lines may become punctured, torn, separated, dented, melted, burned, or otherwise damaged during operation of refuse truck 200 (e.g., due to an unintended combustion event within an engine bay of refuse truck 200, due to combustion of material within body assembly 230, due to a collision between refuse truck 200 and a pole, a tree, a mailbox, another vehicle, or another external object, etc.). One or more fuel lines associated with refuse truck 200 may extend along a longitudinal wall (e.g., an outside sidewall, etc.) of body assembly 230. Damaged fuel lines may leak natural gas into refuse truck 200 and/or into the surrounding environment, thereby causing a reduction in the pressure of the natural gas within the line, as sensed by pressure sensor 218 or another device. Controller 212 may deactivate solenoid valve 222 in response to the pressure fault condition such that fuel pod 210 is isolated or otherwise disengaged. Refuse truck 200 may isolate or otherwise disengage fuel pod 210 to terminate the flow of natural gas in response to the pressure fault condition and thereby reduce (e.g., eliminate, etc.) the risk of expelling natural gas into a surrounding environment and/or reduce the risk of fueling unintended combustion within an engine bay and/or body assembly 230 of refuse truck 200. In other embodiments, controller 212 is configured to provide an operator with an indication (e.g., visual, audible, tactile, etc.) that the pressure has dropped below the pressure threshold. The indication may be a warning or a status indication, among other alternatives. Controller 212 thereby facilitates an operator manually disengaging fuel pod 210 (e.g., stopping the flow of natural gas by manually actuating shutoff valve 250, etc.).

According to an exemplary embodiment, controller 212 is configured to monitor one or more environments associated with refuse truck 200 (e.g., the temperature thereof, for the amount or presence of smoke, etc.) and/or the temperature of one or more components of refuse truck 200. By way of example, controller 212 may be configured to evaluate the temperature data provided by hopper temperature sensor 224, engine bay temperature sensor 226, other temperature sensors 228, and/or still other sensors. In one embodiment, controller 212 is configured to compare the temperature of environments associated with refuse truck 200 and/or the temperature of one or more components of refuse truck 200 with a temperature threshold. In one embodiment, controller 212 is configured to identify a fault condition in response to the temperature of environments associated with refuse truck 200 and/or the temperature of one or more components of refuse truck 200 exceeding the temperature threshold (e.g., exceeding a discrete temperature threshold, exceeding a high value of a temperature threshold range, etc.). In another embodiment, controller 212 is configured to identify a fault condition in response to the amount of smoke within an environment associated with refuse truck 200 exceeding a smoke threshold (e.g., exceeding a discrete smoke threshold, exceeding a high value of a smoke threshold range, etc.). Controller 212 may be configured to deactivate solenoid valve 222 (e.g., actuate solenoid valve 222 toward or into a closed orientation, stop providing a command signal to solenoid valve 222, etc.) in response to identifying the fault condition.

A fault condition relating to the temperature of environments associated with refuse truck 200 and/or the temperature of one or more components of refuse truck 200 exceeding the temperature threshold may define a temperature fault condition. A fault condition relating to the amount of smoke within an environment associated with refuse truck 200 exceeding the smoke threshold may define a smoke fault condition. The temperature fault condition and/or the smoke fault condition may occur due to the environment and/or component experiencing an elevated temperature (e.g., due to excess solar exposure, due to an unintended combustion event within an engine bay of refuse truck 200, due to material combusting within body assembly 230 or another portion of refuse truck 200, due to engine 220 overheating, etc.). Controller 212 may deactivate solenoid valve 222 in response to the temperature fault condition and/or the smoke fault condition such that fuel pod 210 is isolated or otherwise disengaged. Such disengagement may reduce the risk fueling unintended combustion within an engine bay, body assembly 230, and/or another portion of refuse truck 200. Refuse truck 200 may isolate or otherwise disengage fuel pod 210 to terminate the flow of natural gas in response to the temperature fault condition and/or the smoke fault condition and thereby reduce (e.g., eliminate, etc.) the risk of expelling natural gas into the vicinity of environments associated with refuse truck 200 and/or one or more components of refuse truck 200. In other embodiments, controller 212 is configured to provide an operator with an indication (e.g., visual, audible, tactile, etc.) that the temperature has exceeded the temperature threshold and/or the amount of smoke has exceeded the smoke threshold. The indication may be a warning or a status indication, among other alternatives. Controller 212 thereby facilitates an operator manually disengaging fuel pod 210 (e.g., stopping the flow of natural gas by manually actuating shutoff valve 250, etc.).

In one embodiment, controller 212 is configured to deactivate solenoid valve 222 in response to a pressure fault condition, in response to a temperature fault condition, and in response to a smoke fault condition. In another embodiment, controller 212 is configured to deactivate solenoid valve 222 in response to a pressure fault condition, a temperature fault condition, or a smoke fault condition. Refuse truck 200 may thereby include only one or more pressure sensors (e.g., pressure sensor 218, etc.), only one or more temperature sensors (e.g., hopper temperature sensor 224, engine bay temperature sensor 226, other temperature sensors 228, one or more cameras, etc.), only one or more smoke sensors, or any combination thereof. In one embodiment, controller 212 is configured to activate solenoid valve 222 (e.g., by providing a command signal, etc.) only in response to the one or more sensors indicating an "all clear" condition (e.g., indicating that refuse truck 200 is not experiencing a temperature fault condition, is not experiencing a pressure fault condition, and/or is not experiencing a smoke fault condition, etc.).

Refuse truck 200 may include an active purge system. The active purge system may dispense an inert gas into the fuel system of refuse truck 200. The active purge system may reduce the risk of fueling an unintended combustion event and/or may facilitate extinguishing (e.g., entirely extinguish, etc.) an unintended combustion event. Controller 212 may be configured to engage the active purge system in response to at least one of a pressure fault condition, a temperature fault condition, and a smoke fault condition. In one embodiment, the active purge system includes a container (e.g., a tank, etc.) having a fluid (e.g., a compressed gas, cryogenic fluid, etc.) disposed therein. The container may be filled and stored onboard refuse truck 200. The container is selectively coupled to the fuel system of refuse truck 200, according to an exemplary embodiment. By way of example, a valve (e.g., a solenoid valve, etc.) may be positioned to selectively couple the fuel system of refuse truck 200 with the container. Controller 212 may be configured to engage the valve (e.g., provide a signal to open the valve, stop providing a signal that closes the valve, etc.) in response to at least one of a pressure fault condition, a temperature fault condition, and a smoke fault condition. The container may thereafter provide the inert gas (e.g., directly where the fluid within the container is a compressed gas, via a phase change where the fluid within the container is a cryogenic fluid, etc.) to flush the fuel system of refuse truck 200.

According to the exemplary embodiment shown in FIGS. 15-24, fuel pod 210 is positioned at the rear of refuse truck 200. In one embodiment, fuel pod 210 is disposed at a rearmost point of refuse truck 200 (e.g., a position along a longitudinal direction defined by the chassis of refuse truck 200 that opposes a position of the operator cab, etc.). As shown in FIGS. 15-24, fuel pod 210 is coupled to (e.g., attached to, disposed along, mounted on, etc.) tailgate 238.

Refuse truck 200 having fuel pod 210 coupled to tailgate 238 may include one of various vehicle configurations (e.g., front-loading refuse vehicles, side-loading refuse vehicles, etc.) without requiring substantial modification to the structure of fuel pod 210, body assembly 230, tailgate 238, or still another portion of refuse truck 200. Accordingly, a common fuel pod 210 may be used across various product platforms.

According to an exemplary embodiment, positioning fuel pod 210 at the rear of refuse truck 200 (e.g., coupled to tailgate 238, etc.) facilitates achieving weight distribution targets for refuse truck 200. The front axle of traditional refuse trucks may support a relatively large percentage of the total weight thereof. Refuse truck 200 having fuel pod 210 coupled to tailgate 238 has an improved weight distribution, with weight shifted from the front axle of refuse truck 200 to the rear axle of refuse truck 200.

Referring still to the exemplary embodiment shown in FIGS. 15-24, coupling fuel pod 210 to tailgate 238 reduces the overall height of the refuse truck 200 (e.g., relative to a refuse truck 200 having a fuel pod 210 mounted to a top portion of body assembly 230, etc.). Positioning fuel pod 210 below a roofline defined by body assembly 230 may also reduce the risk of damage thereto (e.g., due to a collision between a tree limb or other object and fuel pod 210, etc.). Elevating fuel pod 210 from a position along a chassis of refuse truck 200 (e.g., below a frame rail, at the height of a frame rail, etc.) may also reduce the risk of damage thereto (e.g., due to debris from a road surface that may contact or otherwise engage the fuel pod 210, etc.). Refuse truck 200 having fuel pod 210 attached to tailgate 238 may also have a shorter overall wheelbase relative to refuse vehicles having fuel tanks (e.g., CNG tanks, etc.) disposed along a chassis thereof. In one embodiment, refuse truck 200 has a wheelbase that is too short to accommodate a sufficient number of CNG fuel tanks mounted along the chassis (e.g., along the frame rail, etc.).

Figure 15:
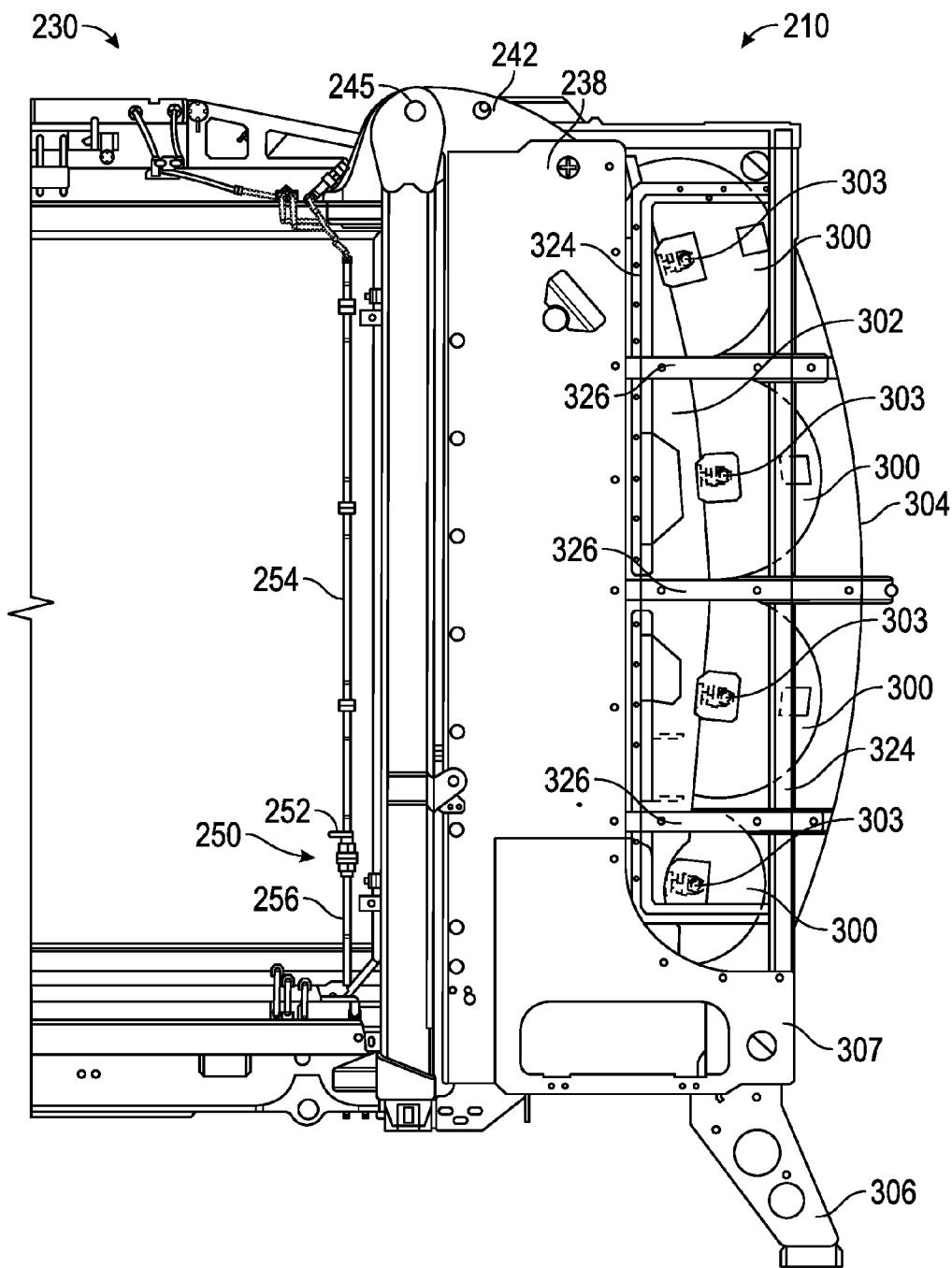
FIG. 15 is a side plan view of the rear portion of the refuse vehicle of FIG. 13 with a portion of the cover of the fuel pod removed, according to an exemplary embodiment.

According to an exemplary embodiment, fuel pod 210 includes a fuel tank configured to contain compressed natural gas within an internal volume. As shown in FIG. 15, fuel pod 210 includes a plurality of fuel tanks 300 coupled to a mounting structure, shown as a rack 302. In one embodiment, the plurality of fuel tanks 300 are strap mounted to rack 302. According to the alternative embodiment shown in FIG. 15, the plurality of fuel tanks 300 include bosses 303 disposed at the ends thereof that are received by a plurality of interfaces of rack 302. According to still other alternative embodiments, the plurality of fuel tanks 300 are otherwise secured to tailgate 238 (e.g., strap mounted directly to a wall of tailgate 238, etc.).

As shown in FIG. 15, shutoff valve 250 is coupled between a first conduit, shown as fuel pod conduit 254, and a second conduit, shown as engine conduit 256. Fuel pod conduit 254 extends between the plurality of fuel tanks 300 of fuel pod 210 and shutoff valve 250. By way of example, solenoid valve 222 may be positioned along fuel pod conduit 254 (e.g., protected within fuel pod 210, etc.). Engine conduit 256 extends between the shutoff valve 250 and engine 220. In one embodiment, one or more covers are associated with shutoff valve 250, fuel pod conduit 254, and/or engine conduit 256 to protect from debris or selectively inhibit access.

As shown in FIG. 15, fuel pod 210 includes a cover 304. Cover 304 is configured to at least partially protect the plurality of fuel tanks 300 during operation of refuse truck 200 (e.g., from minor impacts due to road debris, etc.), according to an exemplary embodiment. In one embodiment, cover 304 at least partially defines an internal space within which the plurality of fuel tanks 300 are disposed. A wall of tailgate 238 may cooperate with cover 304 to define the internal space. In one embodiment, tailgate 238 and cover 304 enclose (e.g., entirely surround, seal off, partially surround, etc.) the plurality of fuel tanks 300. In other embodiments, cover 304 encloses various other components of refuse truck 200.

Figure 16:
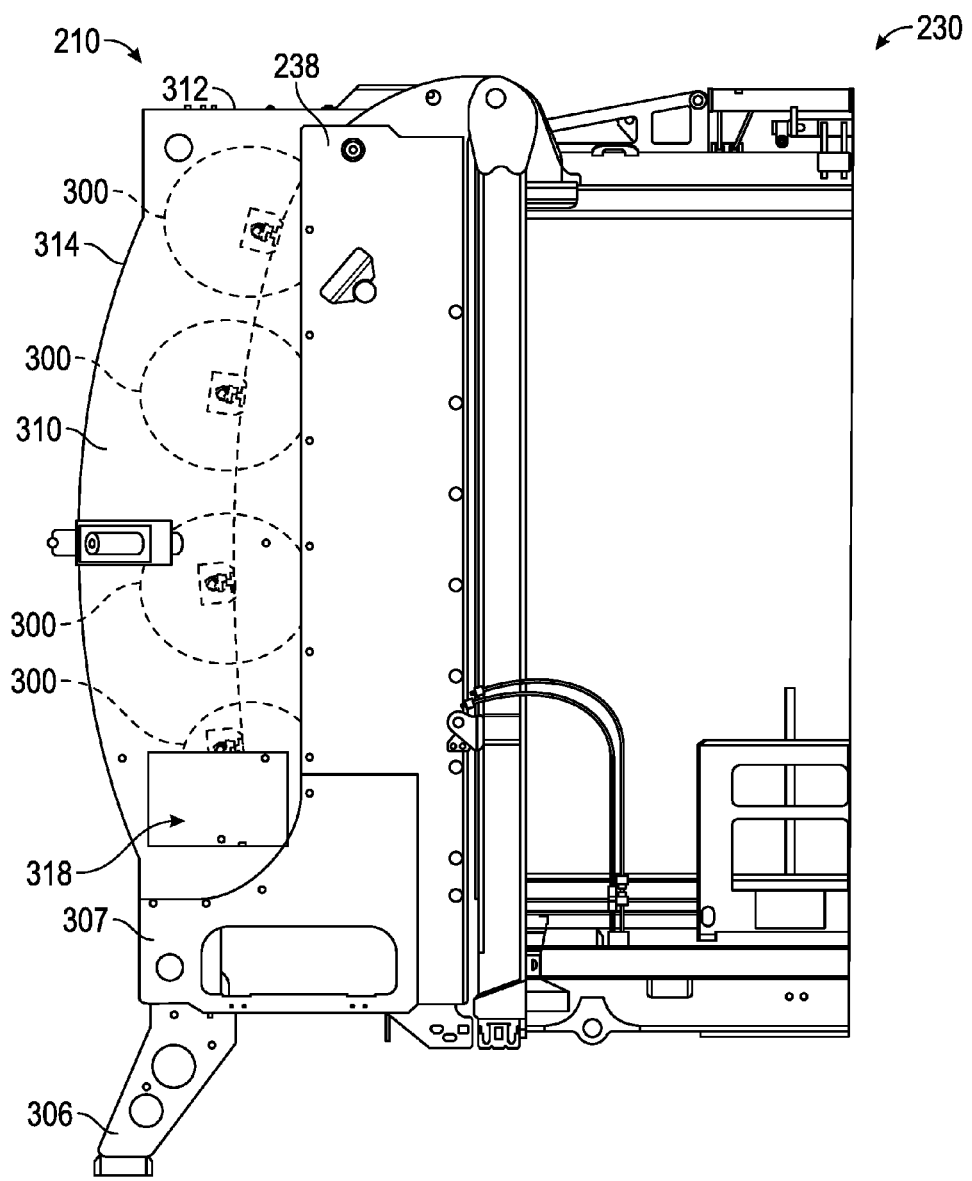
FIG. 16 is a side plan view of the tailgate and the fuel pod of the refuse vehicle of FIG. 13.
Figure 17:
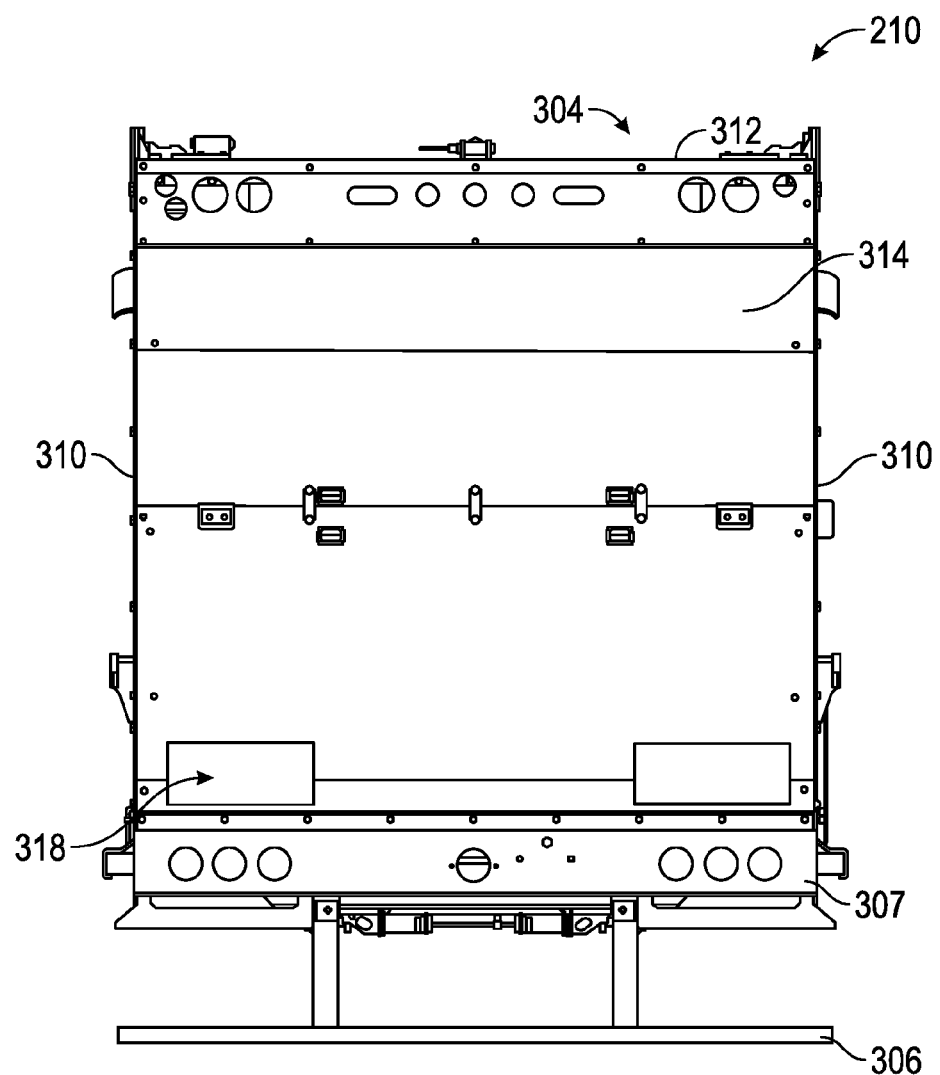
FIG. 17 is a rear plan view of the tailgate and the fuel pod of the refuse vehicle of FIG. 13.

According to the exemplary embodiment shown in FIG. 15, a bumper, shown as bumper 306, is coupled to tailgate 238. As shown in FIGS. 15-21 and 24, bumper 306 is coupled to tailgate 238 with a bumper frame, shown as bumper frame 307. In one embodiment, bumper 306 includes structural elements configured to absorb energy in an impact. Bumper 306 may also support a tool box, a container, or still another device configured to facilitate an operator's use of refuse truck 200. As shown in FIGS. 15-22, bumper frame 307 defines a plurality of apertures that receive lights associated with refuse truck 200 (e.g., directional signals, brake lights, etc.). Various lights or other systems of refuse truck 200 may be coupled to bumper 306. As shown in FIGS. 15-17, bumper fame 307 is coupled to tailgate 238 and includes interfaces (e.g., tabs, brackets, etc.) configured to receive a corresponding portion of bumper 306. In some embodiments, cover 304 at least partially encloses a portion of bumper frame 307. As shown in FIGS. 15-18, cover 304 is configured to enclose a top surface of bumper frame 307.

According to the exemplary embodiment shown in FIGS. 15-21, bumper frame 307 is coupled to tailgate 238 and extends rearward to a rear surface of fuel pod 210. According to an alternative embodiment, bumper frame 307 is coupled to a lower portion of tailgate 238 and extends to a rear portion thereof. In still other embodiments, bumper frame 307 extends longitudinally rearward of fuel pod 210.

Figure 18:
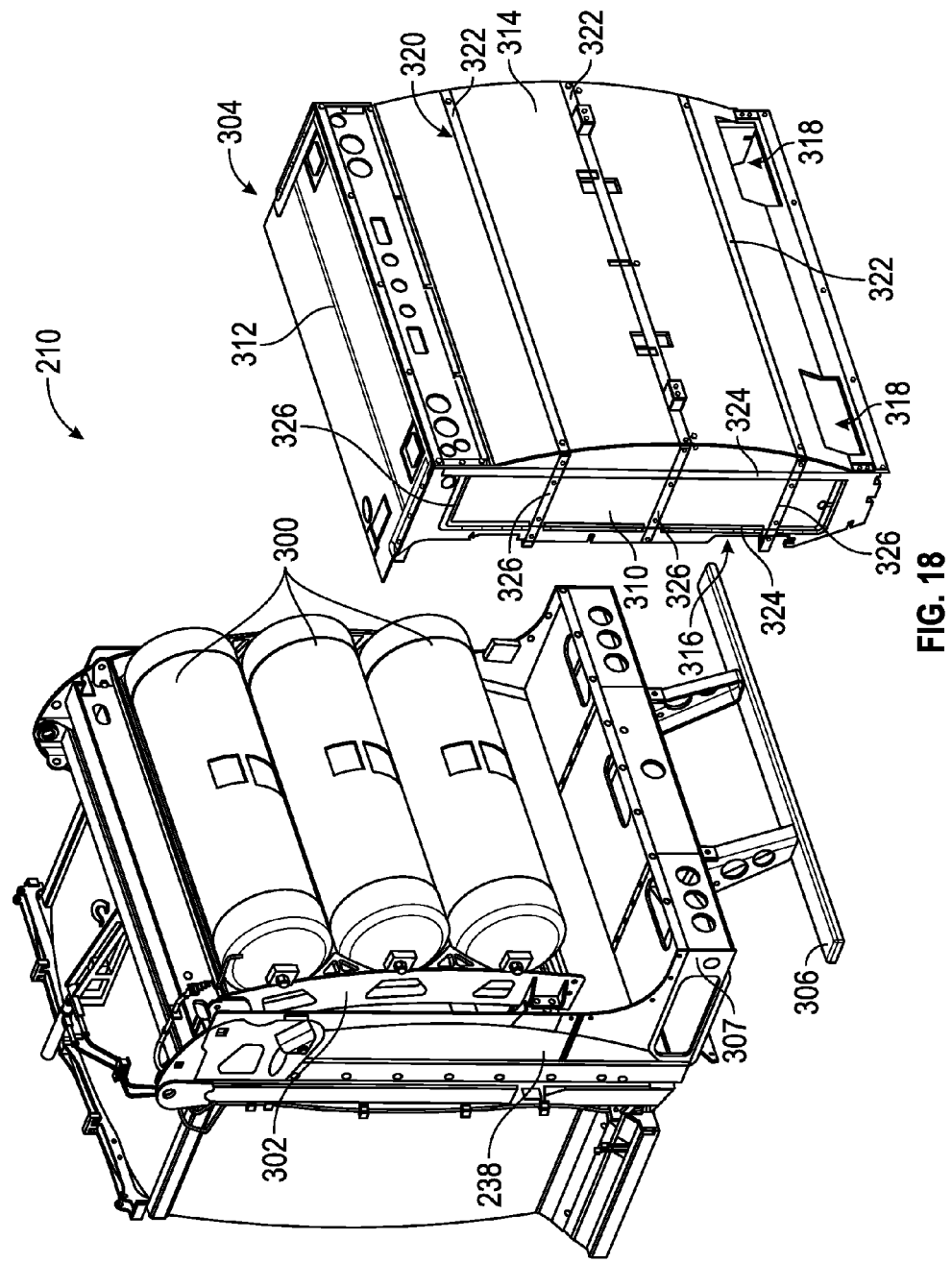
FIG. 18 is an exploded perspective view of the tailgate and the fuel pod of the refuse vehicle of FIG. 13.

As shown in FIGS. 16-18, cover 304 includes a pair of side walls 310, a top wall 312, and a rear wall 314. Sidewalls 310, top wall 312, and rear wall 314 may be integrally formed and define a single unitary body, thereby further improving the impact performance of cover 304. In other embodiments, one or more of sidewalls 310, top wall 312 and rear wall 314 are separate components that are coupled together (e.g., riveted, welded, adhesively secured, etc.). Accordingly, cover 304 may be selectively installed as a single body to enclose the plurality of fuel tanks 300.

As shown in FIG. 18, sidewalls 310, top wall 312, and rear wall 314 define an internal volume 316. In one embodiment, cover 304 is configured to receive fuel tanks 300 into internal volume 316. Cover 304 may also receive rack 302 or other components of fuel pod 210 into internal volume 316. As shown in FIGS. 16-18, an operator may use the internal volume 316 to store equipment for use with refuse truck 200. By way of example, an operator may store tools, protective equipment, safety equipment, or still other products within internal volume 316. According to the exemplary embodiment shown in FIGS. 16-18, cover 304 includes openings 318 that allow access to internal volume 316. In one embodiment, openings 318 are aligned with built-in toolboxes disposed within the internal volume 316. One or more panels may be disposed over openings 318 to facilitate sealing openings 318 from an outside environment. Such panels may be rotatably secured or otherwise coupled to cover 304.

According to the exemplary embodiment shown in FIG. 18, cover 304 has a profile and size that correspond to the various components of fuel pod 210 (e.g., fuel tanks 300, rack 302, bumper frame 307, internal impact mitigation structures, etc.). In other embodiments, at least one of the shape and size of cover 304 is otherwise shaped to accommodate still other components of fuel pod 210, to accommodate external components (e.g., light bars, cameras, etc.), to improve the aesthetic appeal thereof, and/or to improve the performance of refuse truck 200.

According to an exemplary embodiment, cover 304 is releasably coupled to tailgate 238. By way of example, an operator may remove cover 304 from tailgate 238 as a single assembly to facilitate accessing fuel tanks 300. In other embodiments, cover 304 includes one or more removable panels to facilitate accessing fuel tanks 300. According to an exemplary embodiment, cover 304 includes a plurality of interfaces that engage corresponding features defined by tailgate 238. By way of example, cover 304 may define apertures (e.g., bores, holes, slots, etc.) that receive projections (e.g., studs, tabs, etc.) of tailgate 238. Cover 304 may be secured to tailgate 238 with one or more fastening systems (e.g., straps, latches, snaps, etc.). According to an alternative embodiment, cover 304 is otherwise secured to tailgate 238 (e.g., pivotally coupled to, fixed to, etc.). According to still another alternative embodiment, fuel pod 210 is disposed along a rear portion of refuse truck 200 (e.g., in the position shown in FIGS. 15-18, etc.) and pivotally coupled directly to body assembly 230 (e.g., with a hinge similar to hinge 242, etc.). Cover 304 may be coupled to rack 302 and rotate with fuel tanks 300 and rack 302 relative to body assembly 230.

According to an exemplary embodiment, the highest point of fuel pod 210 (e.g., top wall 312 of cover 304, etc.) is positioned below pivot point 245. Positioning fuel pod 210 below pivot point 245 may reduce the risk of inadvertent damage during normal vehicle operation (e.g., damage to fuel tanks 300 or cover 304 while the vehicle is traveling under an overpass or doorway, etc.). Positioning fuel pod 210 below pivot point 245 may also reduce the risk of inadvertent contact between fuel pod 210 and various components or structures disposed atop body assembly 230 (e.g., when tailgate 238 is rotated about pivot point 245, etc.). In other embodiments, fuel pod 210 is configured such that the highest point of fuel pod 210 is elevated above pivot point 245. By way of example, fuel pod 210 may be raised to improve the dynamic properties of tailgate 238 (e.g., by positioning fuel tanks 300 above the centerline of tailgate 238, actuator 244 may lift tailgate 238 according to a preferred force or speed profile, etc.).

Figure 19:
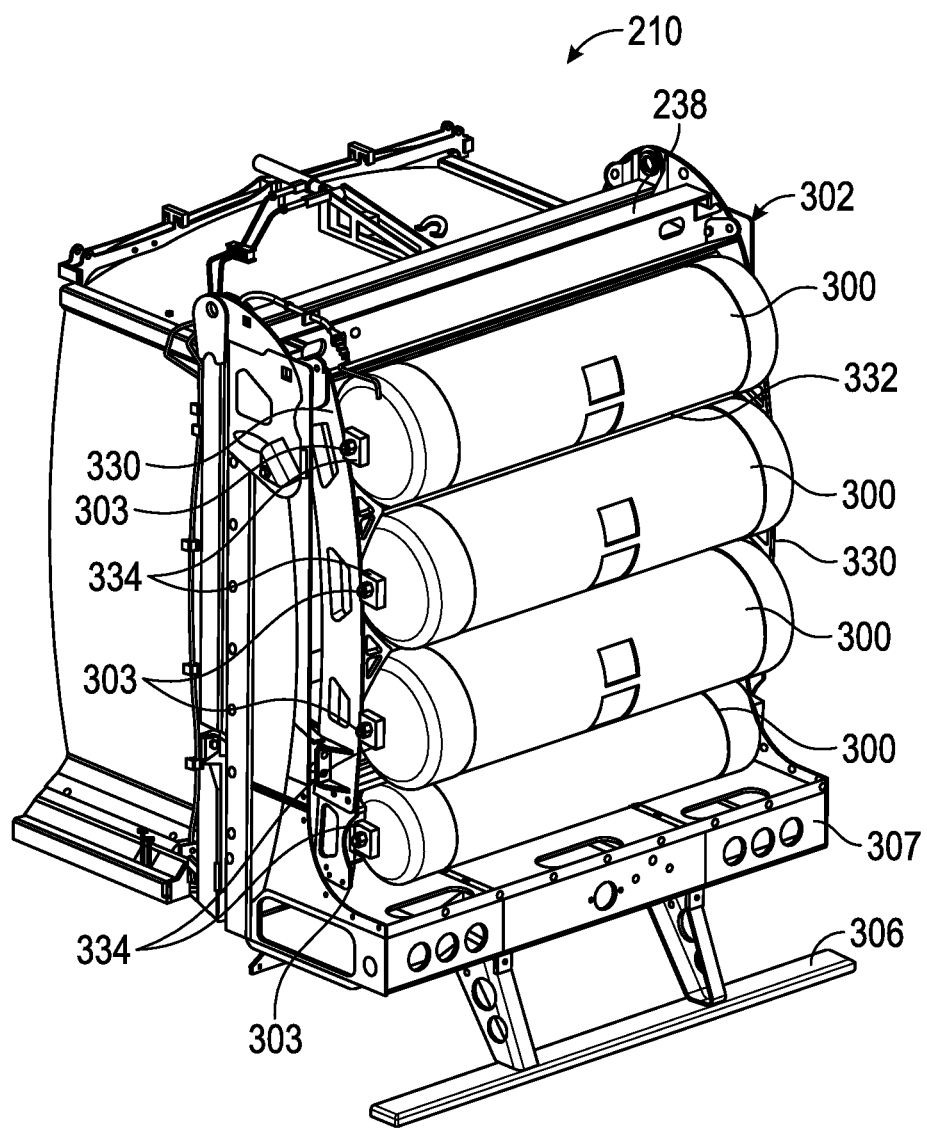
FIG. 19 is a perspective view of the tailgate and the fuel pod of the refuse vehicle of FIG. 13 with the cover hidden.
Figure 20:
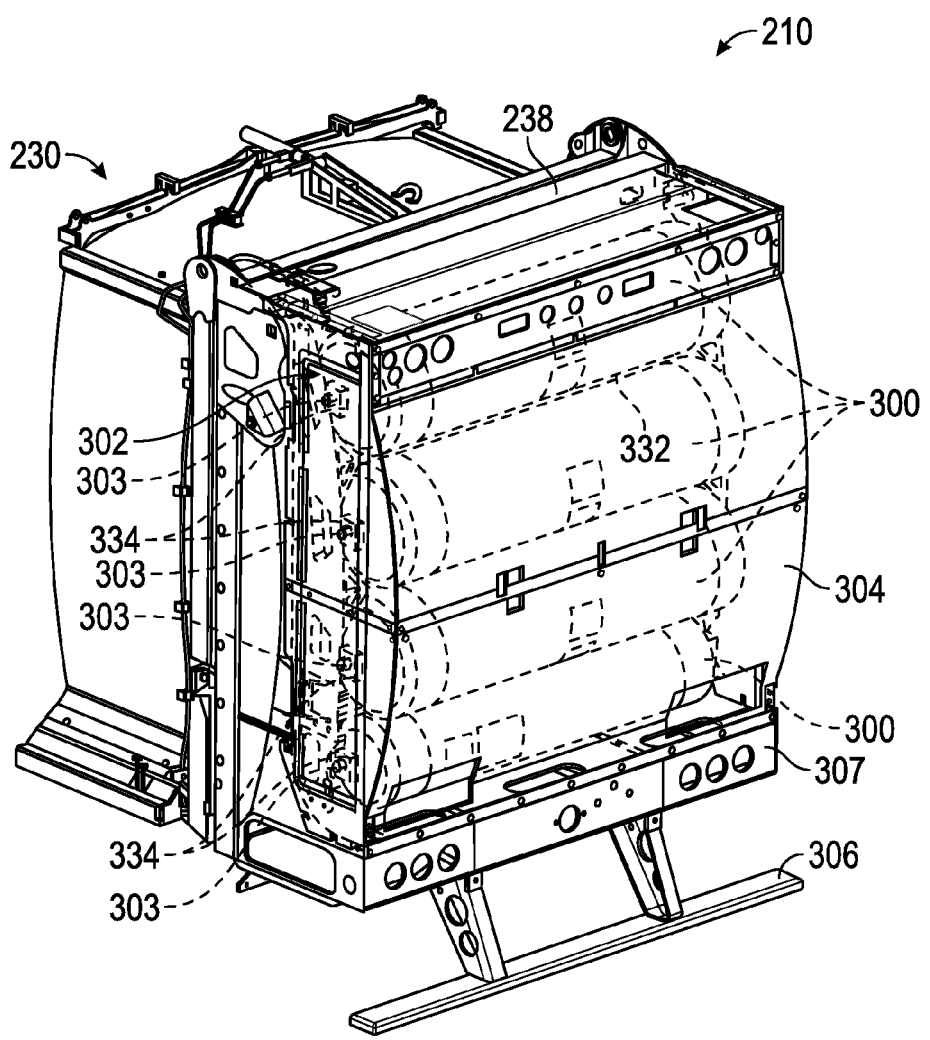
FIG. 20 is a left perspective view of the rear portion of the refuse vehicle of FIG. 13 with internal components shown.
Figure 21:
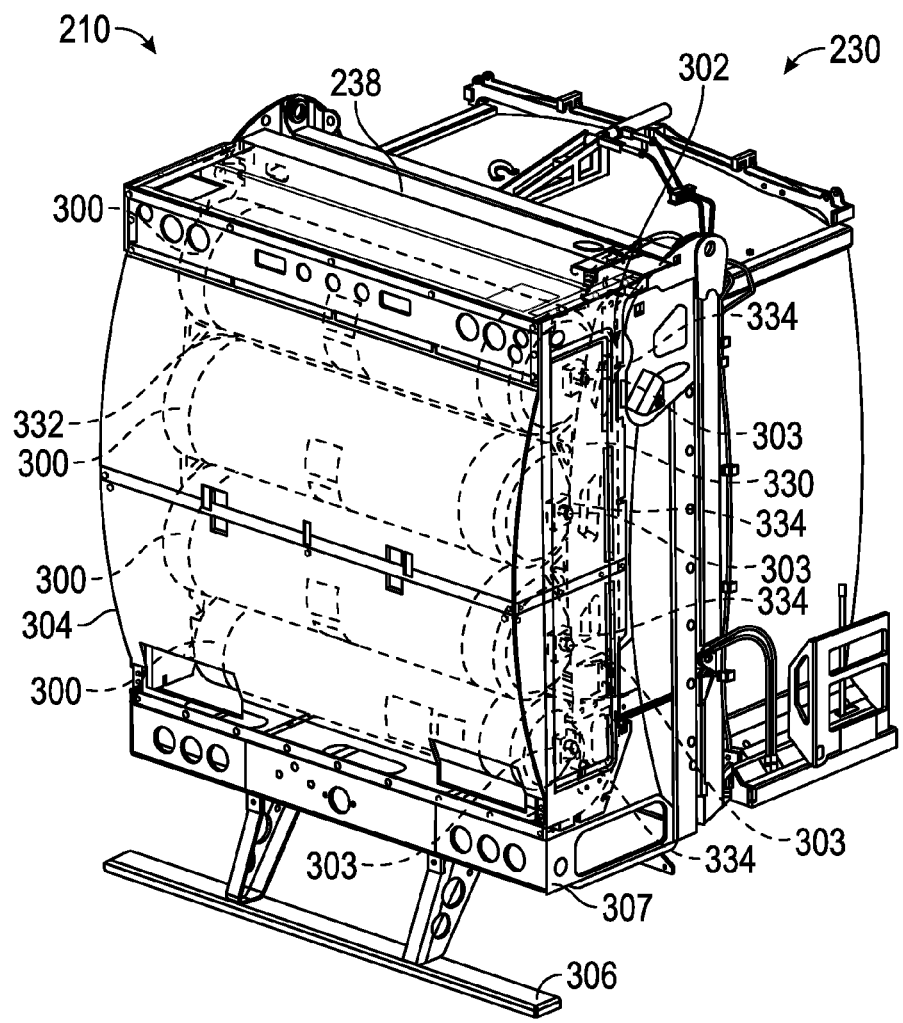
FIG. 21 is a right left perspective view of the rear portion of the refuse vehicle of FIG. 13 with internal components shown.
Figure 24:
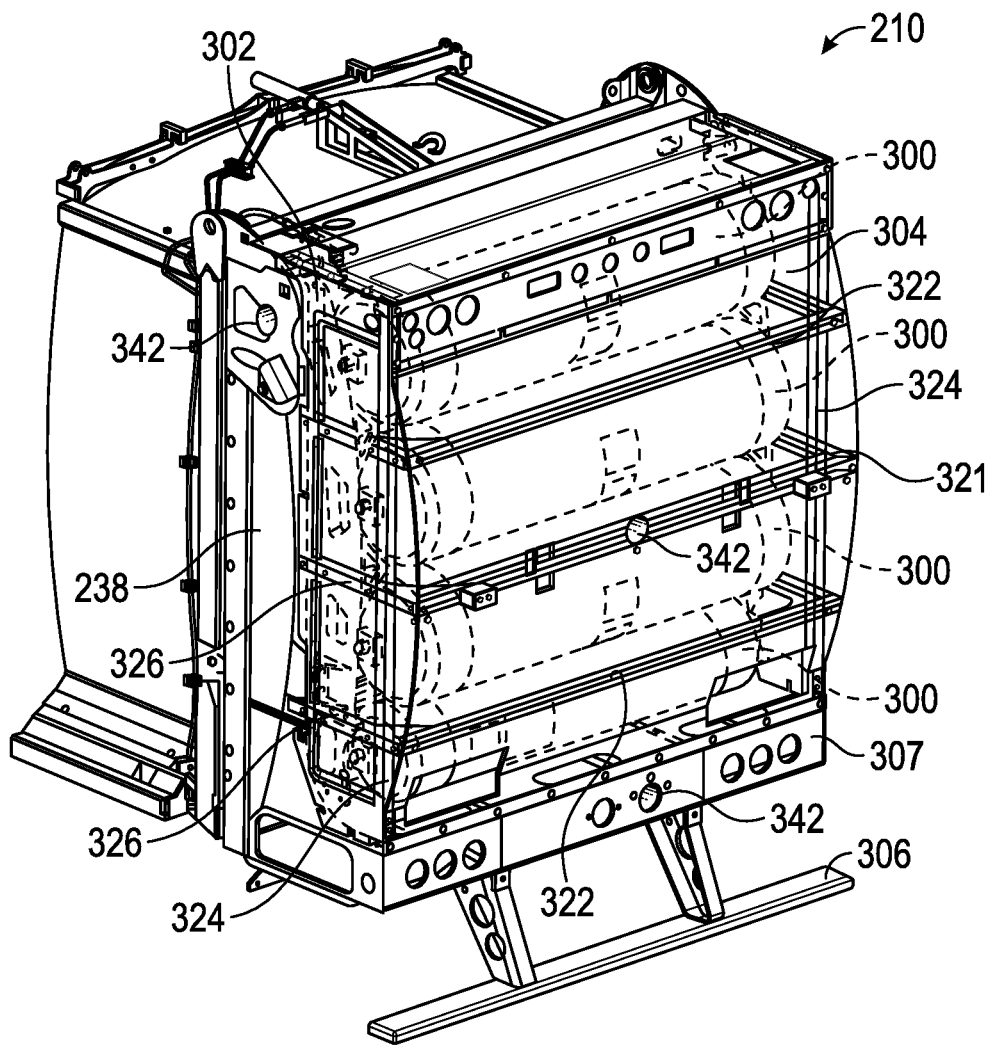
FIG. 24 is a perspective view of the tailgate and the fuel pod of the refuse vehicle of FIG. 13 with various sensor locations shown, according to an exemplary embodiment.

According to the exemplary embodiment shown in FIGS. 15, 18, and 24, fuel pod 210 includes an impact mitigation system, shown as skeleton 320. As shown in FIGS. 15, 18, and 24, skeleton 320 is fixed to cover 304. Skeleton 320 may be fixed to tailgate 238 or rack 302, or moveably coupled to cover 304, tailgate 238, or rack 302, according to various other embodiments. A plurality of non-structural conduits, raceways, and/or channels 321 configured to contain wiring, hydraulic lines, and/or other components may also be coupled to cover 304. In still other embodiments, light bars or other devices may be integrated into cover 304. According to an exemplary embodiment, skeleton 320 is a mechanical system that operates without sensor input or electronic control. Skeleton 320 may define a passive impact mitigation system that reduces the risk of damage to fuel tanks 300 and associated valves and plumbing independent of operator control. As shown in FIG. 19, skeleton 320 at least partially surrounds fuel tanks 300. In one embodiment, skeleton 320 defines a protected region (e.g., pod, nest, cocoon, etc.) within which fuel tanks 300 are disposed.

According to an exemplary embodiment, skeleton 320 defines a plurality of load paths configured to redirect impact energy around fuel tanks 300. According to an exemplary embodiment, skeleton 320 includes a plurality of structural frame members designed to at least one of transmit and absorb impact energy. While shown in FIGS. 15, 18, and 24 as disposed within cover 304, at least a portion of skeleton 320 may be provided outside cover 304, according to various alternative embodiments. The frame members of skeleton 320 may be formed using various component shapes (e.g., angle material, channels, plates, tubes, stamped or otherwise formed members, etc.).

As shown in FIGS. 15, 18, and 24, skeleton 320 includes a plurality of lateral frame members 322, a plurality of vertical frame members 324, and a plurality of longitudinal frame members 326. In one embodiment, lateral frame members 322 extend laterally across a longitudinal direction defined by body assembly 230 of refuse truck 200, whereas longitudinal frame members 326 extend along the longitudinal direction defined by body assembly 230 of refuse truck 200.

According to an exemplary embodiment, skeleton 320 includes a plurality of metal frame members. In other embodiments, skeleton 320 includes frame members that are manufactured using a composite or another material. The frame members of skeleton 320 may be welded, fastened, adhesively secured, or still otherwise coupled to one another. In other embodiments, various frame members of skeleton 320 are integrally formed and define a single unitary body (i.e., a single, formed component may replace several of the frame members shown in FIG. 19, etc.). By way of example, lateral frame members 322 and the corresponding longitudinal frame members 326 may be formed as a single U-shaped member.

Referring still to FIGS. 15, 18, and 24, lateral frame members 322 are positioned rearward of fuel tanks 300 and are coupled on either end to vertical frame members 324. In one embodiment, at least one lateral frame member 322 is disposed along a rearmost portion of cover 304. Longitudinal frame members 326 are positioned on either end of fuel tanks 300 and positioned laterally outward of fuel tanks 300, according to the exemplary embodiment shown in FIGS. 15, 18, and 24. In one embodiment, longitudinal frame members 326 are coupled to vertical frame members 324. According to an exemplary embodiment, longitudinal frame members 326 are generally aligned with lateral frame members 322 (e.g., disposed within the same horizontal plane, etc.). Vertical frame members 324 may be coupled to bumper frame 307. In one embodiment, vertical frame members 324 extend vertically to a height that is above the uppermost fuel tank 300, thereby further protecting such fuel tanks 300 from damage due to impact forces. In some embodiments, longitudinal frame members 326 are coupled to tailgate 238. In other embodiments, longitudinal frame members 326 are coupled to rack 302. In still other embodiments, longitudinal frame members 326 may contact tailgate 328 or rack 302 (e.g., during operation of refuse truck 200, upon impact, etc.) but are not directly coupled thereto. In one embodiment, lateral frame members 322, vertical frame members 324, and longitudinal frame members 326 are interconnected at the various joints such that skeleton 320 defines the protected region within which fuel tanks 300 are disposed. In one embodiment, skeleton 320 cooperates with bumper frame 307 to define the protected region. Bumper frame 307 may itself include a plurality of structural plates, tubes, or other structures configured to at least one of transmit and absorb impact forces.

During the operation of refuse truck 200, fuel pod 210 may experience impact loading. By way of example, a vehicle impacting the rear of refuse truck 200 may impart impact loading on fuel pod 210. By way of another example, refuse truck 200 may back into an object (e.g., as an operator reverses refuse truck 200, etc.), thereby imparting impact loading on fuel pod 210. By way of still another example, impact loading may be imparted into fuel pod 210 as tailgate 238 is opened (e.g., where fuel pod 210 is driven into contact with a tree, doorway, or other object, etc.). According to an exemplary embodiment, the impact forces are transmitted around fuel tanks 300 by skeleton 320. By way of example, skeleton 320 may redirect an impact force from the rear of refuse truck 200 through lateral frame members 322, and into tailgate 238 via longitudinal frame members 326. In still other embodiments, the impact forces are absorbed by skeleton 320. Skeleton 320 may include one or more crushable members configured to plastically deform to absorb at least a portion of such impact forces. In other embodiments, skeleton 320 includes one or more resilient members configured to non-plastically deform to absorb at least a portion of such impact forces.

Bumper frame 307 may also redirect impact forces that may otherwise be transmitted into fuel tanks 300. In one embodiment, bumper frame 307 extends longitudinally rearward of fuel tanks 300 such that a portion of bumper frame 307 contacts an object (e.g., a vehicle, a vertical wall, etc.) before fuel tanks 300 (e.g., during a rear end collision, when an operator backs into a vertical wall, etc.). In other embodiments, at least one of bumper 306 and bumper frame 307 are configured and/or positioned such that bumper 306 contacts an object before fuel tanks 300.

Skeleton 320 may include various other frame members (e.g., diagonal members, braces, gussets, etc.) to reinforce at least one of lateral frame members 322, vertical frame members 324, and longitudinal frame members 326. In other embodiments, various frame members may replace at least one of lateral frame members 322, vertical frame members 324, and longitudinal frame members 326.

According to the exemplary embodiment shown in FIGS. 19-22, rack 302 includes a pair of side members 330. As shown in FIGS. 19-22, side members 330 are generally parallel to one another and extend vertically along fuel pod 210. According to an exemplary embodiment, side members 330 are spaced apart and coupled with lateral cross-members 332. The side members 330 include sockets 334 that receive bosses 303 of fuel tanks 300.

Figure 22:
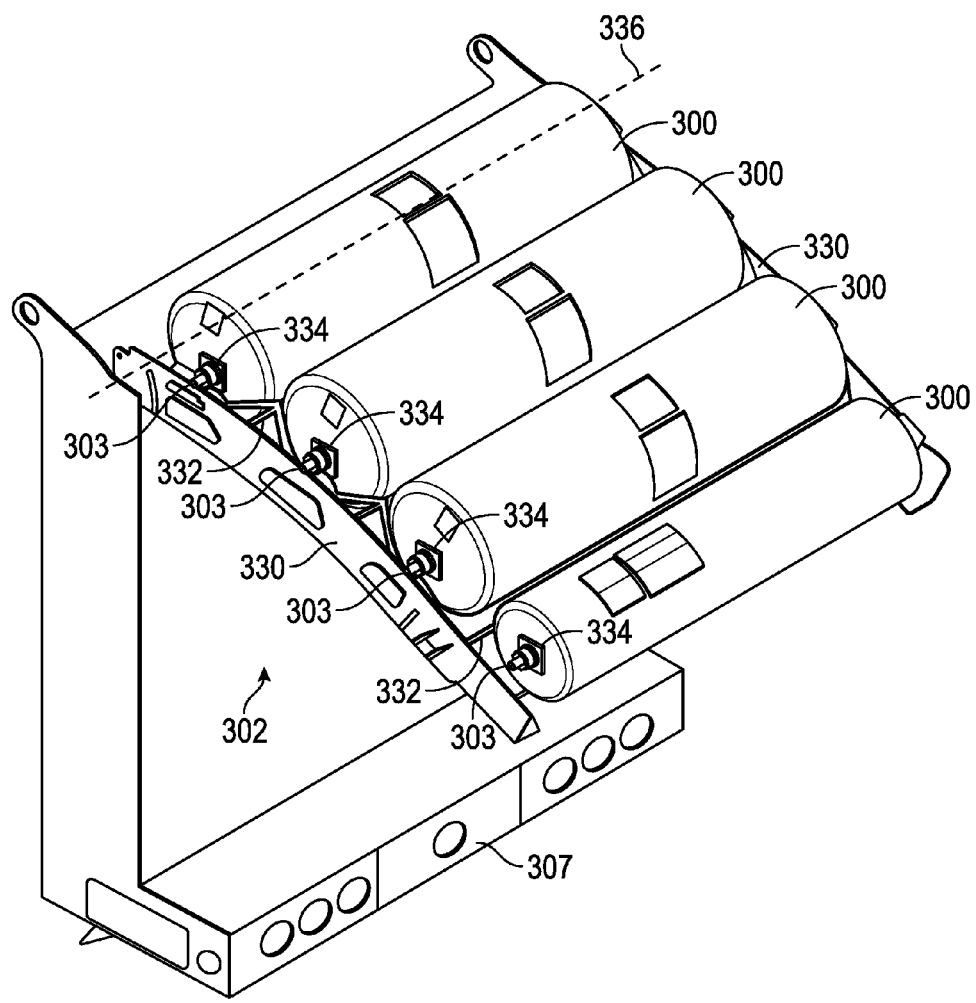
FIG. 22 is a perspective view of a rack and fuel tanks of a fuel pod coupled to a tailgate, according to an exemplary embodiment.
Figure 23A:
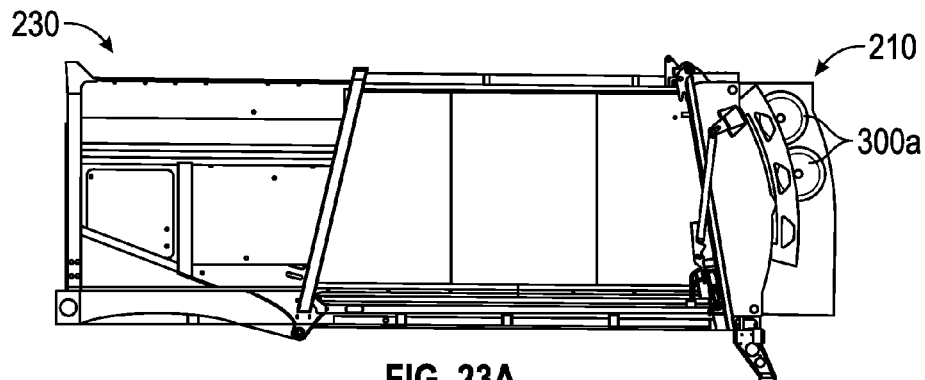
FIGS. 23A-23D are side elevation views of the refuse vehicle of FIG. 13, showing various fuel tank configurations, according to several exemplary embodiments.
Figure 23B:
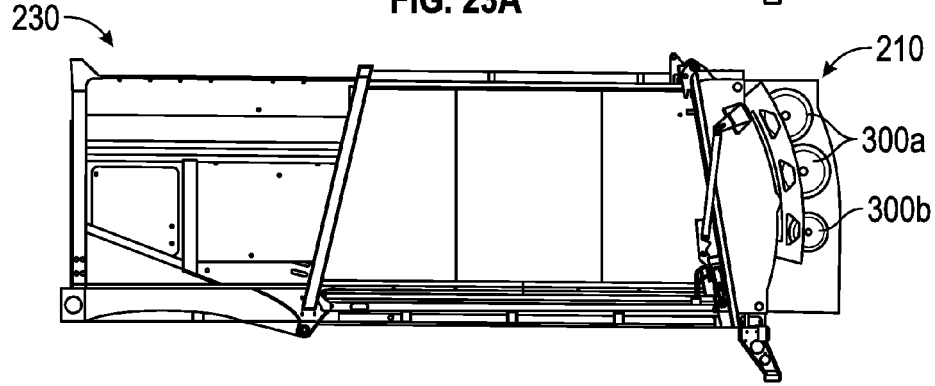
Figure 23C:
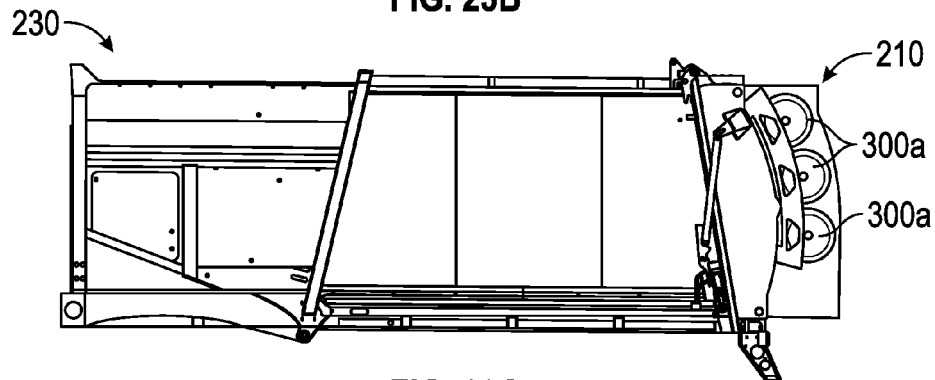
Figure 23D:
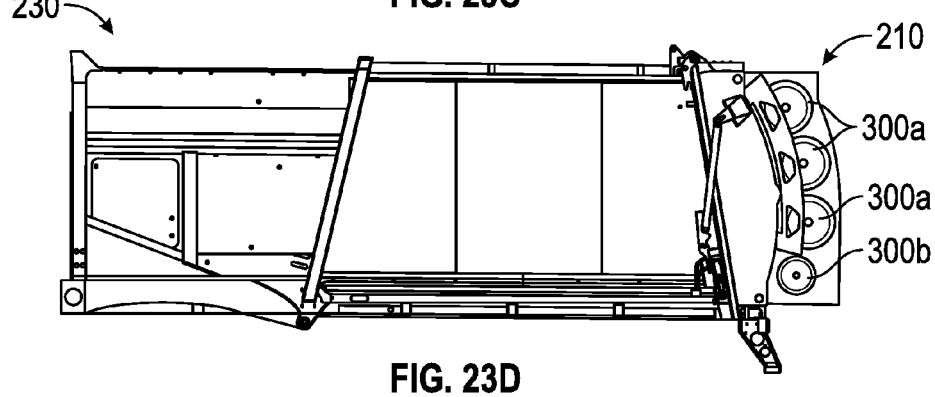

According to the exemplary embodiment shown in FIG. 22, rack 302 is coupled to tailgate 238 such that it may pivot about a pivot axis 336. Movement of rack 302 may facilitate inspection of fuel tanks 300. An operator of refuse truck 200 may move rack 302 about pivot axis 336 to access the forward side of fuel tanks 300 (e.g., to service fuel tanks 300, inspect fuel tanks 300, etc.). In one embodiment, rack 302 rotates about a pivot axis 336 along the top of rack 302. In other embodiments, pivot axis 336 extends along a side of rack 302 (e.g., along one of side members 330, etc.) or laterally along the bottom of rack 302. In other embodiments, rack 302 is otherwise moveable relative to tailgate 238 to allow access to the forward side of fuel tanks 300. By way of example, rack 302 may be moveable along rails.

As shown in FIGS. 19-22, sockets 334 are spaced apart such that rack 302 is able to receive fuel tanks 300 of various sizes. In one embodiment, rack 302 is configured to receive any tank having a diameter of between 16 in. and 21 in. In other embodiments, rack 302 may be configured to receive any other suitably sized fuel tank (e.g., a tank with a diameter below 16 in. or above 21 in., etc.). In one embodiment, rack 302 is configured to receive up to four fuel tanks 300, allowing fuel pod 210 to have a volume fuel capacity of between 60 and 105 diesel gallons equivalent (DGE). In other embodiments, rack 302 is configured to receive three or fewer fuel tanks 300 or five or more fuel tanks 300, thereby providing still another range of volume fuel capacities.

According to the various embodiments shown in FIGS. 23A-23D, fuel pod 210 is a modular system that may be configured to provide various fuel capacities. In the embodiment shown in FIG. 23A, fuel pod 210 is configured to include two fuel tanks 300a having a first size (e.g., first diameter, etc.). In the embodiment shown in FIG. 23B, fuel pod 210 has a second capacity and includes two fuel tanks 300a having a first size (e.g., first diameter, etc.) and one fuel tank 300b having a second size (e.g., second diameter, etc.). In the embodiment shown in FIG. 23C, fuel pod 210 has a third capacity and includes three fuel tanks 300a having a first size (e.g., first diameter, etc.). In the embodiment shown in FIG. 23D, fuel pod 210 has a fourth capacity and includes three fuel tanks 300a having a first size (e.g., first diameter, etc.), and one fuel tank 300b having a second size (e.g., second diameter, etc.). According to an exemplary embodiment, fuel tank 300a includes a tank having a diameter of 21 in., a length of 86 in., and a capacity of 30 DGE. Fuel tank 300b may include a tank having a diameter of 16 in., a length of 83 in., and a capacity of 15 DGE. In other embodiments, fuel pod 210 may be configured to receive fuel tanks of other sizes and capacities in a variety of configurations. Fuel pod 210 may have various open sockets such that the fuel capacity thereof may be retroactively adjusted (e.g., expanded at a later date, etc.).

Figure 25:
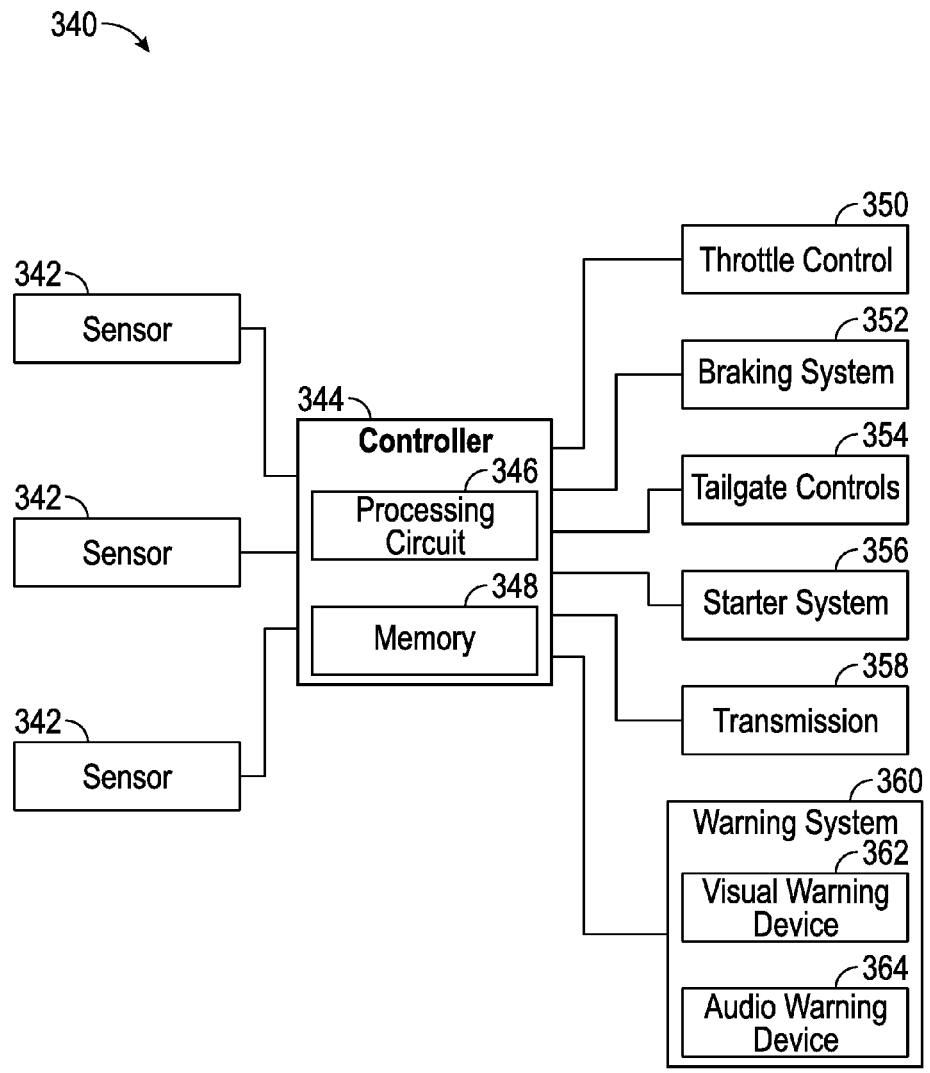
FIG. 25 is a schematic view of an impact mitigation system for a refuse vehicle, according to an exemplary embodiment.

Referring to the exemplary embodiment shown in FIGS. 24-25, a refuse truck includes an active impact mitigation system 340. Active impact mitigation system 340 is configured to reduce the risk of damage to fuel tanks 300 during operation of the refuse truck, according to an exemplary embodiment. As shown in FIGS. 24-25, active impact mitigation system 340 includes at least one sensor 342. In one embodiment, active impact mitigation system 340 is configured to monitor the proximity of fuel pod 210 to various structures and hazards surrounding the refuse truck. Sensors 342 may be mounted to the exterior of the refuse truck. By way of example, sensors 342 may be coupled to tailgate 238, fuel pod 210, rear bumper frame 307, or still another component. Sensors 342 may include various devices configured to determine the distance between a portion of refuse truck 200 and a surrounding structure or object (e.g., cameras, RADAR systems, LIDAR systems, ultrasonic sensors, visual sensors, laser sensors, etc.). In other embodiments, sensors 342 include rotational position sensors (e.g., positioned to measure an angular position of tailgate 238, etc.). In still other embodiments, sensors 342 include accelerometers positioned to provide data relating to an impact force or acceleration (e.g., an impact force experienced by fuel pod 210, etc.). Sensors 342 may be mounted flush on refuse truck 200 such that they are unobtrusive and minimally impact the functionality of refuse truck 200.

As shown in FIG. 25, active impact mitigation system 340 includes a controller 344. Controller 344 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the embodiment shown in FIG. 25, controller 344 includes a processing circuit 346 and a memory 348. Processing circuit 346 may include an ASIC, one or more FPGAs, a DSP, circuits containing one or more processing components, circuitry for supporting a microprocessor, a group of processing components, or other suitable electronic processing components.

In some embodiments, controller 344 is configured to execute computer code stored in memory 348 to facilitate the activities described herein. Memory 348 may be any volatile or non-volatile computer-readable storage medium capable of storing data or computer code relating to the activities described herein. In one embodiment, memory 348 has computer code modules (e.g., executable code, object code, source code, script code, machine code, etc.) configured for execution by processing circuit 346. In some embodiments, controller 344 represents a collection of processing devices (e.g., servers, data centers, etc.). In such cases, processing circuit 346 represents the collective processors of the devices, and memory 348 represents the collective storage devices of the devices.

According to an exemplary embodiment, controller 344 is configured to receive data from sensors 342 relating to the position of fuel pod 210 relative to another object (e.g., an object of the surrounding environment, another portion of the refuse truck, etc.). Controller 344 may be further coupled to various vehicle systems and configured to control the operation thereof. By way of example, controller 344 may be coupled to a throttle control 350 for engine 220, a braking system 352, tailgate controls 354, a starter system 356, a transmission 358, or a warning system 360, among other vehicle systems. Controller 344 may be coupled to a controller area network bus of engine 220 (e.g., part of an engine management system, etc.).

Controller 344 may output a control signal to one or more vehicle systems to at least one of avoid an impact, mitigate an impact by reducing the relative velocity between the vehicle and the object, isolate or otherwise disengage fuel pod 210, and warn the operator of the vehicle of a potential impact in response to the data from the sensors 342. In one embodiment, controller 344 provides the output control signal in response to the data from the sensor 342 indicating that an object is within a predetermined distance from fuel pod 210. By way of example, controller 344 may at least one of shut down throttle control 350, activate braking system 352, prevent starter system 356 from starting engine 220, prevent transmission 358 from being shifted into reverse to slow or stop vehicle, close a shutoff valve associated with the fuel tanks 300, and prevent the vehicle from moving in a rearward direction in response to an object being detected within a predetermined distance of the vehicle.

In other embodiments, controller 344 provides an output control signal to close a shutoff valve associated with fuel tanks 300, otherwise isolate fuel tanks 300, or otherwise disengage fuel tanks 300 in response to data indicating an impact above a threshold range (e.g., that the fuel pod 210 is experiencing an impact loading or acceleration above a threshold range, etc.). In still other embodiments, the controller 344 may lock out tailgate controls 354 to prevent tailgate 238 from being raised in response to an indication that raising tailgate 238 could cause an impact with an object. Controller 344 may further instruct warning system 360 to alert an operator of the vehicle in response to at an indication that at least one of moving the vehicle in a rearward direction and moving tailgate 238 could cause an impact between an object and fuel pod 210. Warning system 360 may include at least one of a visual warning device 362 (e.g., light, dash icon, etc.) and an audio warning device 364 (e.g., buzzer, chime, verbal recording, etc.). Warning system 360 may be configured to warn a driver of the vehicle or an operator standing alongside the vehicle.

In another embodiment, controller 344 sends a control signal to engage an impact absorbing device in response to data from sensor 342 (e.g., indicating that an object is within a predetermined distance from fuel pod 210, indicating that the vehicle is experiencing impact loading above a threshold level, etc.). Such impact absorption devices may be any device that reduces the relative velocity between the vehicle and the object or otherwise absorbs an impact force from the object. By way of example, the impact absorption device may include an airbag system that is configured to deploy an inflated airbag cushion between fuel pod 210 and an object or internally deploy an inflated airbag cushion between fuel tanks 300 and a portion of fuel pod 210.

At least one of the various controllers described herein may be implemented as a general-purpose processor, an application specific integrated circuit (ASIC), one or more field programmable gate arrays (FPGAs), a digital-signal-processor (DSP), a group of processing components, or other suitable electronic processing components. In one embodiment, at least one of the controllers includes memory and a processor. The memory is one or more devices (e.g., RAM, ROM, Flash Memory, hard disk storage, etc.) for storing data and/or computer code for facilitating the various processes described herein. The memory may be or include non-transient volatile memory or non-volatile memory. The memory may include database components, object code components, script components, or any type of information structure for supporting the various activities and information structures described herein. The memory may be communicably connected to the processor and provide computer code or instructions to the processor for executing the processes described herein. The processor may be implemented as a general-purpose processor, an application specific integrated circuit (ASIC), one or more field programmable gate arrays (FPGAs), a digital-signal-processor (DSP), a group of processing components, or other suitable electronic processing components.

It is important to note that the construction and arrangement of the elements of the systems and methods as shown in the embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. The order or sequence of any process or method steps may be varied or re-sequenced, according to alternative embodiments. Other substitutions, modifications, changes, and omissions may be made in the design, operating conditions, and arrangement of the preferred and other embodiments without departing from scope of the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data, which cause a general-purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

What is claimed is:

1. A refuse vehicle, comprising:
   a chassis having an engine;
   a body assembly defining an internal volume and coupled to the chassis;
   a tailgate pivotally attached to the body assembly and movable between an open position and a closed position to selectively expose the internal volume of the body assembly;
   a CNG fuel system including a CNG fuel tank coupled to the tailgate and moveable therewith, wherein the engine is configured to be powered by the CNG fuel system;
   at least one of a non-structural conduit, a non-structural raceway, and a non-structural channel configured to contain at least one of wiring and a hydraulic line;
   an impact mitigation system comprising a passive system and including a skeleton, the skeleton comprising a plurality of structural frame members positioned to direct impact loads around the CNG fuel tank, wherein the impact mitigation system provides a protected region within which the CNG fuel tank is disposed.

2. The refuse vehicle of claim 1, further comprising a cover defining an inner space within which the CNG fuel tank is disposed.

3. The refuse vehicle of claim 2, wherein the skeleton is coupled to the cover and moveable therewith.

4. The refuse vehicle of claim 1, wherein the CNG fuel system includes a controller and a shutoff valve configured to selectively restrict a flow of fuel from the CNG fuel system to the engine.

5. The refuse vehicle of claim 4, wherein the shutoff valve comprises a normally-closed valve configured to be actuated into an open position in response to receiving an actuation signal from the controller.

6. The refuse vehicle of claim 5, wherein the CNG fuel system includes a pressure sensor positioned along the flow of fuel to monitor a pressure thereof.

7. The refuse vehicle of claim 6, wherein the controller is configured to terminate transmission of the actuation signal to the shutoff valve such that the shutoff valve restricts the flow of fuel in response the pressure of the flow of fuel falling below a pressure threshold.

8. The refuse vehicle of claim 5, wherein the CNG fuel system includes at least one temperature sensor positioned to monitor a temperature of at least one of a bay within which the engine is disposed and the internal volume of the body assembly.

9. The refuse vehicle of claim 8, wherein the controller is configured to terminate transmission of the actuation signal to the shutoff valve such that the shutoff valve restricts the flow of fuel in response to the temperature of the at least one of the bay within which the engine is disposed and the internal volume of the body assembly exceeding a temperature threshold.

10. The refuse vehicle of claim 5, wherein the normally-closed valve is a normally-closed solenoid valve configured to actuate from a closed position to the open position in response to receiving the actuation signal from the controller.

11. The refuse vehicle of claim 1, further comprising a shutoff valve coupled to a lower portion of body assembly such that an operator of the refuse vehicle is able to manually isolate the CNG fuel system by engaging the shutoff valve.

12. The refuse vehicle of claim 1, wherein the impact mitigation system comprises an active system including at least one sensor positioned to monitor a relative position of the CNG fuel system and an object within a surrounding environment.

13. The refuse vehicle of claim 12, wherein the active system includes a controller coupled to the at least one sensor, the controller configured to engage one or more vehicle systems to at least one of: (a) avoid an impact, (b) mitigate an impact by reducing a relative velocity between the refuse vehicle and the object, (c) isolate or otherwise disengage the CNG fuel system, and (d) warn an operator of the refuse vehicle of a potential impact in response to data received from the at least one sensor.

14. A fuel system for a vehicle, comprising:
   a CNG fuel tank configured to provide fuel to power an engine of the vehicle;
   a shutoff valve configured to be positioned along a flow path between the CNG fuel tank and the engine, wherein the shutoff valve is configured to selectively restrict a flow of fuel along the flow path;
   a temperature sensor configured to monitor a temperature of at least one of the engine of the vehicle and a temperature associated with a body area of the vehicle and provide a temperature signal; and
   a controller coupled to the temperature sensor and the shutoff valve, wherein the controller is configured to at least one of engage and disengage the shutoff valve in response to the temperature signal indicating a temperature in excess of a temperature threshold.

15. The fuel system of claim 14, further comprising a pressure sensor configured to monitor a pressure of the flow of fuel and provide a pressure signal, wherein the controller is configured to at least one of engage and disengage the shutoff valve in response to the pressure signal indicating a pressure below a pressure threshold.

16. The fuel system of claim 14, further comprising a proximity sensor positioned to monitor a relative position of the fuel system and an object within a surrounding environment.

17. The fuel system of claim 16, wherein the controller is configured to at least one of engage and disengage the shutoff valve such that the shutoff valve restricts the flow of fuel in response to the object having a proximity that is closer than a distance threshold.

18. A fuel system for a vehicle, comprising:
a CNG fuel tank configured to provide fuel to power an engine of the vehicle;
a shutoff valve positioned along a flow path between the CNG fuel tank and the engine, wherein the shutoff valve is configured to selectively restrict a flow of fuel along the flow path;
a pressure sensor positioned along the flow path and configured to monitor a pressure of the flow of fuel;
a proximity sensor positioned to monitor a relative position between the fuel system and an object within a surrounding environment; and
a controller coupled to the pressure sensor and the shutoff valve, wherein the controller is configured to:
identify a pressure fault condition in response to the pressure of the fuel falling below a pressure threshold, the pressure threshold relating to an expected operating pressure of the fuel; and
at least one of engage and disengage the shutoff valve such that the shutoff valve restricts the flow of fuel in response to the pressure fault condition.

19. The fuel system of claim 18, wherein the controller is configured to at least one of engage and disengage the shutoff valve such that the shutoff valve restricts the flow of fuel in response to the object having a proximity that is closer than a distance threshold.

* * * * *